(12) United States Patent
Namihira et al.

(10) Patent No.: US 9,544,473 B2
(45) Date of Patent: Jan. 10, 2017

(54) INFORMATION PROCESSING SYSTEM AND INFORMATION PROCESSING METHOD

(71) Applicants: Kohsuke Namihira, Tokyo (JP); Mitsuo Ando, Fukuoka (JP)

(72) Inventors: Kohsuke Namihira, Tokyo (JP); Mitsuo Ando, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/886,224

(22) Filed: Oct. 19, 2015

(65) Prior Publication Data

US 2016/0119506 A1 Apr. 28, 2016

(30) Foreign Application Priority Data

Oct. 20, 2014 (JP) .................. 2014-213843
Oct. 19, 2015 (JP) .................. 2015-205216

(51) Int. Cl.
*G06F 3/12* (2006.01)
*H04N 1/64* (2006.01)
*H04N 1/00* (2006.01)

(52) U.S. Cl.
CPC ............ *H04N 1/64* (2013.01); *H04N 1/00312* (2013.01); *H04N 1/00328* (2013.01)

(58) Field of Classification Search
CPC ..................... H04N 1/3875; H04N 2201/0081; H04N 2201/0087; H04N 1/32603; H04N 1/646; H04N 1/00469; H04N 1/12; H04N 1/128; G03G 21/0011; G03G 21/0017; G03G 21/1814; G06F 3/1204; G06F 3/1205; G06F 3/125
USPC .............. 358/1.15, 448, 450, 404, 1.16, 1.9, 444,358/468, 474, 400, 408, 451, 462, 471, 496,358/501, 515; 430/619, 620, 551, 559, 617, 430/618, 224, 243, 336, 348, 350, 517, 527, 430/531, 568, 598, 600, 601, 603, 613, 631, 430/945; 382/284, 173, 232, 298, 140, 181
See application file for complete search history.

(56) References Cited

U.S. PATENT DOCUMENTS

| 9,124,733 | B2 | 9/2015 | Ando | |
|---|---|---|---|---|
| 2004/0255263 | A1* | 12/2004 | Ando | G06F 8/60 717/100 |
| 2006/0070087 | A1* | 3/2006 | Ando | H04N 1/00278 719/320 |
| 2007/0064892 | A1* | 3/2007 | Ando | H04N 1/32561 379/114.28 |

(Continued)

FOREIGN PATENT DOCUMENTS

| JP | 2014-032659 | 2/2014 |
| JP | 2014-102577 | 6/2014 |

*Primary Examiner* — Negussie Worku
(74) *Attorney, Agent, or Firm* — IPUSA, PLLC

(57) ABSTRACT

An information processing system is provided that includes a device and an information processing apparatus that is connected to the device via a network. The device is configured to scan image data from a paper document, generate reduced data from image data of a part of pages of the paper document each time the image data of the part of the pages of the paper document is scanned, transmit the reduced data to the information processing apparatus each time the reduced data is generated, perform a second process, which differs from a first process performed by the information processing apparatus, with respect to the image data scanned from the paper document to generate second data, receive via the network, first data generated by the first process that is performed by the information processing apparatus with respect to the reduced data, and synthesize the first data and the second data.

7 Claims, 33 Drawing Sheets

(56) References Cited

U.S. PATENT DOCUMENTS

| | | | | |
|---|---|---|---|---|
| 2007/0124510 | A1* | 5/2007 | Ando | G06F 8/68 710/8 |
| 2008/0316510 | A1* | 12/2008 | Sakaue | H04N 1/32101 358/1.9 |
| 2009/0059287 | A1* | 3/2009 | Yamada | H04N 1/00222 358/1.15 |
| 2009/0067724 | A1* | 3/2009 | Hirohata | G03G 21/046 382/190 |
| 2009/0110313 | A1* | 4/2009 | Sakaue | H04N 1/32101 382/243 |
| 2009/0316170 | A1* | 12/2009 | Tsujii | G03G 15/50 358/1.9 |
| 2010/0027060 | A1* | 2/2010 | Ogino | H04N 1/00411 358/1.15 |
| 2011/0167081 | A1* | 7/2011 | Kosaka | G06K 9/00456 707/769 |
| 2013/0019160 | A1* | 1/2013 | Bando | H04N 1/00244 715/234 |
| 2016/0080587 | A1* | 3/2016 | Ando | H04N 1/00244 358/1.15 |
| 2016/0132348 | A1* | 5/2016 | Sakino | G06F 9/45558 718/1 |

* cited by examiner

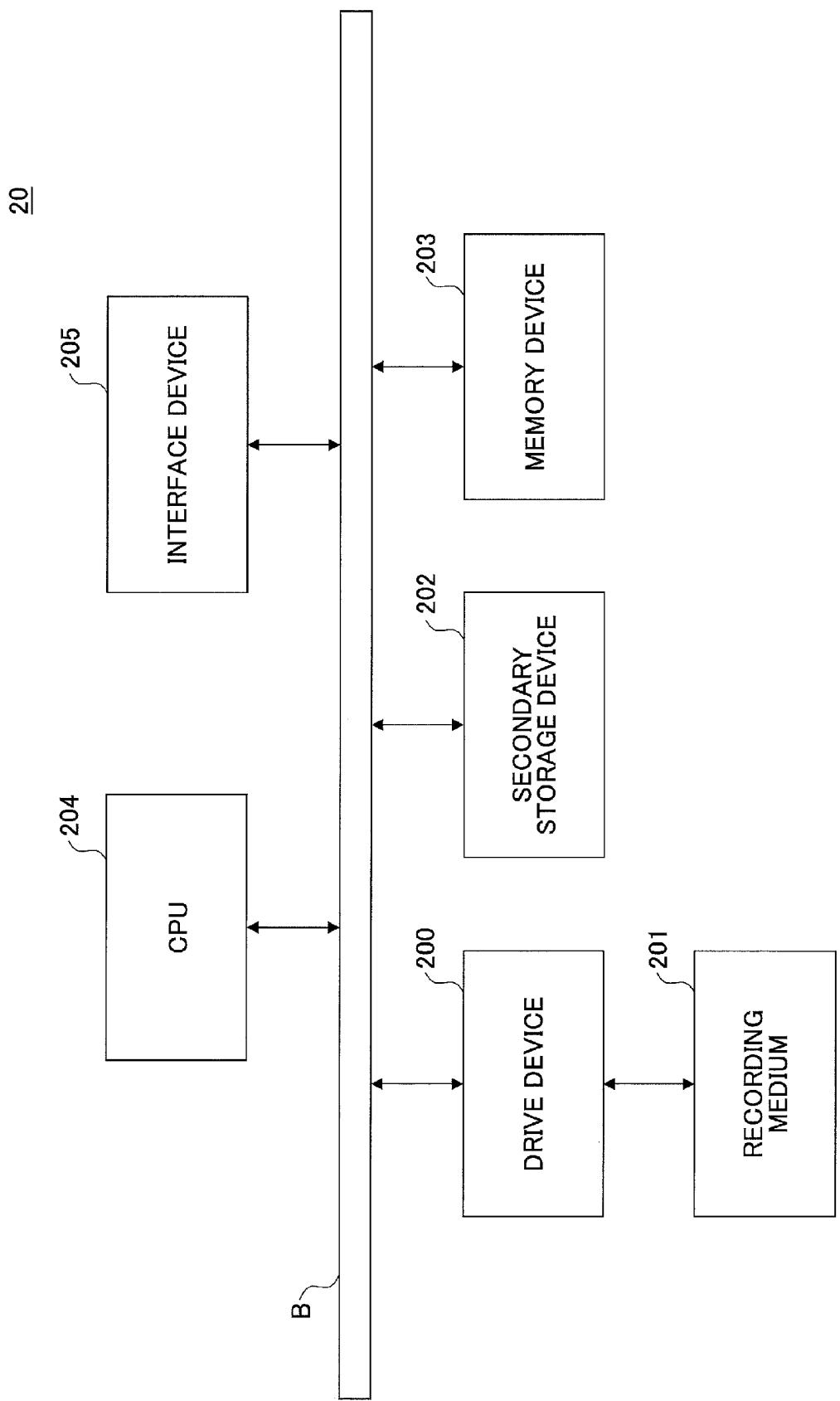

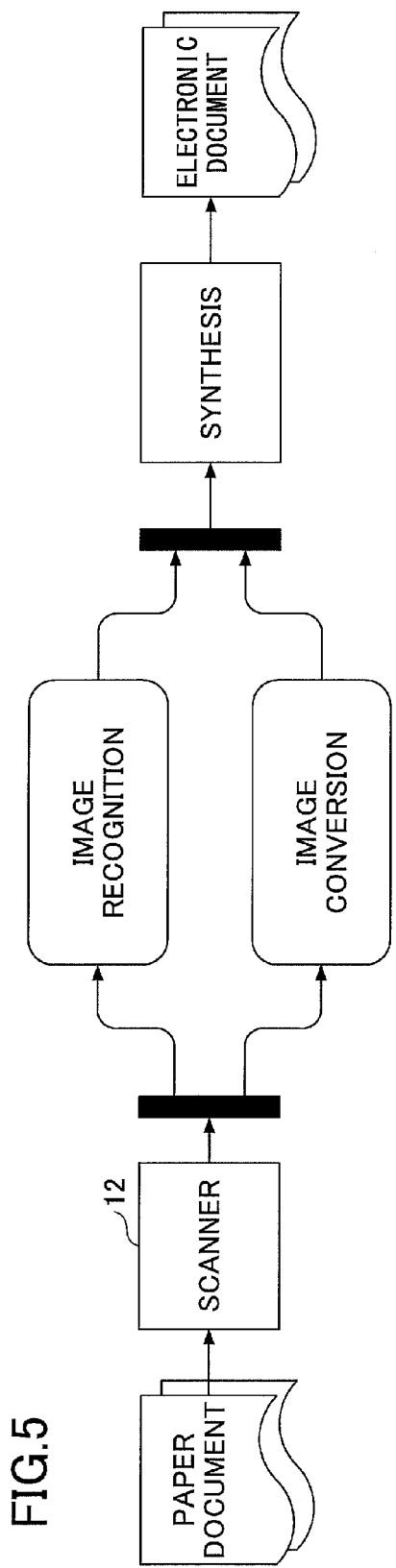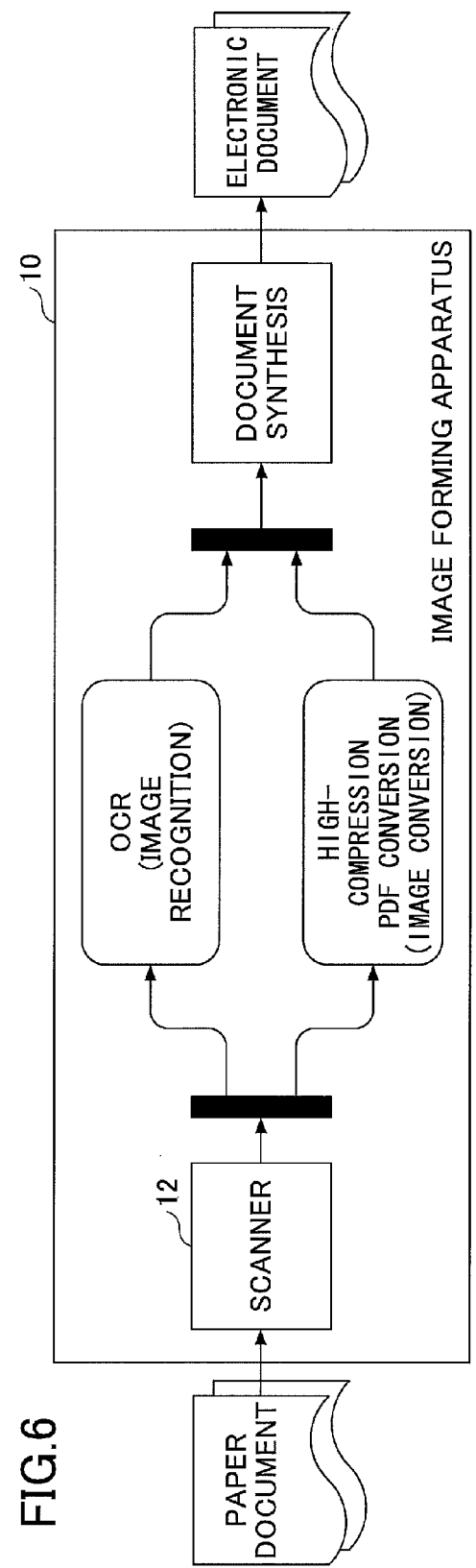

| COMMUNICATION SPEED (kbps) | PROCESSING TIME (SEC) |
|---|---|
| 50 | 21.7 |
| 100 | 11.3 |
| 114 | 10 |
| 200 | 6.7 |
| 300 | 4.4 |

| COMMUNICATION SPEED (kbps) | PROCESSING TIME (SEC) |
|---|---|
| 5 | 24 |
| 10 | 13 |
| 13.8 | 10 |
| 114 | 3.1 |
| 200 | 2.6 |

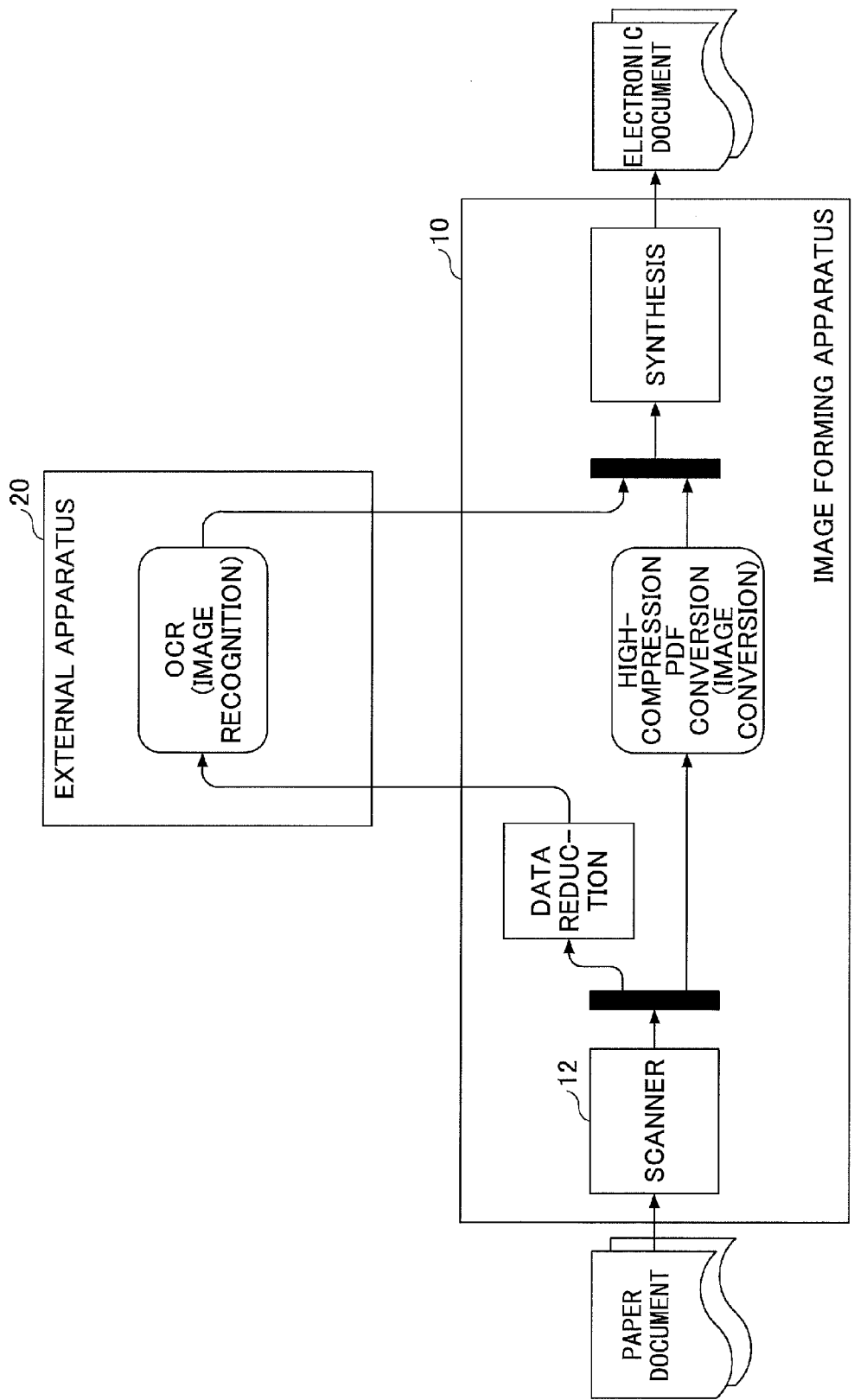

FIG.12

Title: [CLOUD OCR USAGE] ～f1
dpiX= 302  dpiY= 302 ～f2
W= 2480  H= 3507 ～f3
RotAngle= 0 ～f4

| COMMUNICATION SPEED (kbps) | TOTAL PROCESSING TIME (SEC) |
|---|---|
| 5 | 260 |
| 10 | 150 |
| 50 | 62 |
| 100 | 51 |
| 150 | 47 |
| 200 | 45 |

FIG.26

| COMMUNICATION SPEED (kbps) | TOTAL PROCESSING TIME (SEC) |
|---|---|
| 5 | 48 |
| 10 | 33 |
| 50 | 24.2 |
| 100 | 23.1 |
| 150 | 22.73 |
| 200 | 22.55 |

INFORMATION PROCESSING SYSTEM AND INFORMATION PROCESSING METHOD

BACKGROUND OF THE INVENTION

1. Field of the Invention

The present invention relates to an information processing system and an information processing method.

2. Description of the Related Art

Image forming apparatuses such as multifunction peripherals (MFP) are known that are capable of implementing various advanced image processing functions with respect to image data in addition to traditional functions such as copying, printing, scanning, etc. For example, image forming apparatuses are known that are capable of performing an OCR (Optical Character Recognition) process with respect to image data scanned from a document (see e.g. Japanese Laid-Open Patent Publication No. 2014-32659).

However, restrictions are imposed on hardware resources of devices such as image forming apparatuses, and as a result, when performing image processes requiring a high processing load, their processing speed may be inferior to that of general-purpose computers.

Accordingly, in the case of performing an image process requiring a high processing load, the image forming apparatus may send a process request via a network to an external apparatus such as a computer having a relatively higher processing performance, for example.

However, in the case of sending a process request via a network, depending on the network communication speed, the transmission time for transmitting the image data to be processed to the external apparatus may take up a significant part of the overall processing time. As a result, there may be situations where the overall processing time would be shorter if all processes were performed within the image forming apparatus.

SUMMARY OF THE INVENTION

One aspect of the present invention is directed to reducing the influence of network communication upon requesting an external apparatus to perform a process via a network.

According to one embodiment of the present invention, an information processing system is provided that includes a device and an information processing apparatus that is connected to the device via a network. The device includes a scanning unit configured to scan image data from a paper document; a reduction unit configured to generate reduced data from image data of a part of pages of the paper document each time the image data of the part of the pages of the paper document is scanned by the scanning unit, the reduced data being generated by reducing a data size of the image data of the part of the pages of the paper document; a first transmitting unit configured to transmit the reduced data to the information processing apparatus each time the reduced data is generated by the reduction unit; a second data generating unit configured to perform a second process with respect to the image data scanned from the paper document by the scanning unit and generate second data, the second process being different from a first process that is performed by the information processing apparatus; a first receiving unit configured to receive via the network, first data generated by the first process that is performed by the information processing apparatus with respect to the reduced data; and a synthesis unit configured to synthesize the first data and the second data. The scanning unit scans the image data from the paper document in parallel with the generation of the reduced data by the reduction unit, the transmission of the reduced data by the first transmitting unit, the reception of the first data by the first receiving unit, and the synthesis by the synthesis unit. The information processing apparatus includes a second receiving unit configured to receive the reduced data transmitted by the first transmitting unit, a first data generating unit configured to perform the first process with respect to the reduced data received by the second receiving unit and generate the first data, and a second transmitting unit configured to transmit the first data generated by the first data generating unit to the device.

BRIEF DESCRIPTION OF THE DRAWINGS

FIG. 4 is a diagram illustrating an exemplary hardware configuration of an external apparatus according to the first embodiment;

FIG. 5 is a diagram schematically illustrating an image process according to the first embodiment;

FIG. 6 is a diagram illustrating a specific example of the image process implementing a specific image recognition process and a specific image conversion process;

FIG. 9 is a diagram illustrating a process of requesting the external apparatus to perform an OCR process according to the first embodiment;

FIG. 12 illustrates an example of text data with coordinates;

FIG. 24 is a table illustrating an exemplary relationship between communication speed and total processing time;

FIG. 26 is a table illustrating another exemplary relationship between communication speed and total processing time;

DESCRIPTION OF THE PREFERRED EMBODIMENTS

In the following, embodiments of the present invention are described with reference to the accompanying drawings.

Figure 1:
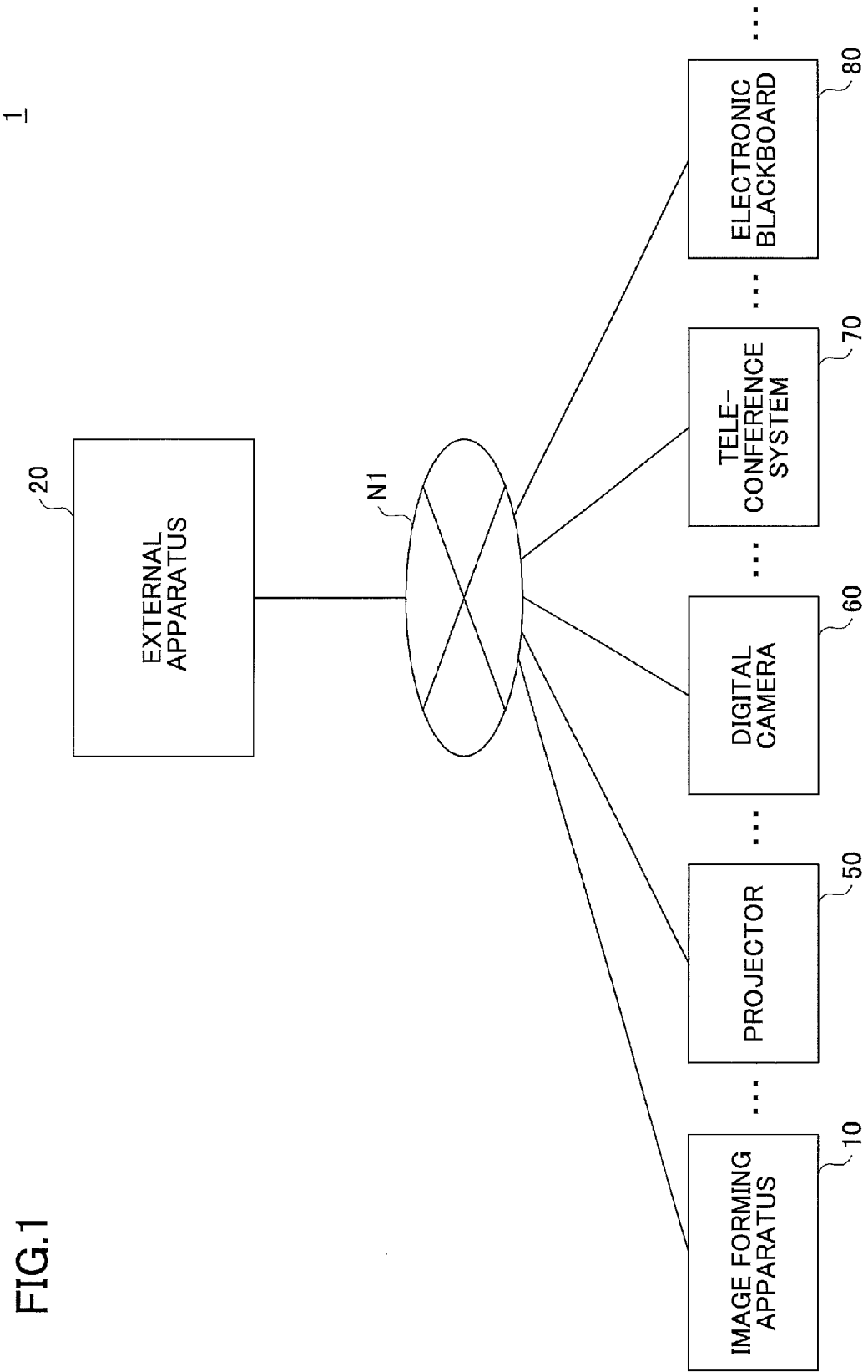
FIG. 1 is a diagram illustrating an exemplary configuration of an information processing system according to a first embodiment of the present invention.

FIG. 1 is a diagram illustrating an exemplary configuration of an information processing system 1 according to a first embodiment of the present invention. In the information processing system 1 illustrated in FIG. 1, an external apparatus 20 is connected to various devices via a network N1. The network N1 may be, for example, a LAN (Local Area Network), the Internet, or a USB (Universal Serial Bus) a cable. In FIG. 1, one or more image forming apparatuses 10, one or more projectors 50, one or more digital cameras 60, one or more teleconferencing systems 70, and one or more electronic blackboards 80 are illustrates as examples of the various devices that are connected to the external apparatus 20 via the network N1.

The image forming apparatus 10 may be, for example, a scanner, a printer, or a MFP. In the present embodiment, the image forming apparatus 10 performs an image process with respect to image data input by scanning a paper document. Also, the image forming apparatus 10 may make a process request to the external apparatus 20 to execute a part of the image process (i.e., the image forming apparatus 10 may delegate a part of the image process to the external apparatus 20). In this way, the processing load of the image forming apparatus 10 may be reduced. That is, in the present embodiment, the execution of processes of an image process with respect to image data input to the image forming apparatus 10 is distributed to the image forming apparatus 10 and the external apparatus 20. Note that the information processing system 1 may include a plurality of the image forming apparatuses 10 that are installed in the same office or school, or different offices or schools, for example. Note that devices other than the image forming apparatus 10 may make a process request to the external apparatus 20. For example, the projector 50, the digital camera 60, the teleconferencing system 70, the electronic blackboard 80, or some other device may make a process request to the external apparatus 20.

Figure 2:
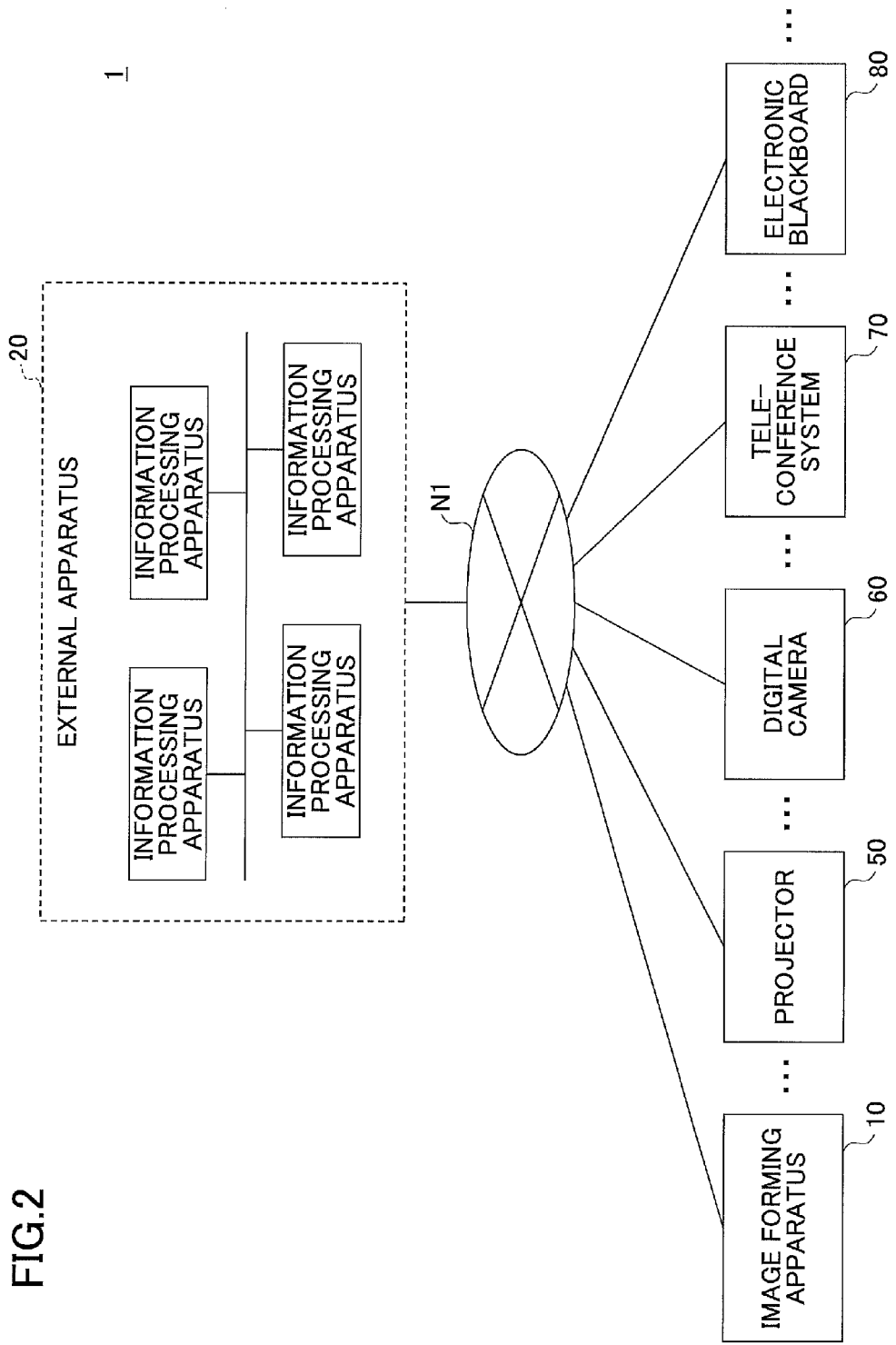
FIG. 2 is a diagram illustrating another exemplary configuration of the information processing system according to the first embodiment.

The external apparatus 20 may be a computer that executes a process that is subject to a process request transmitted from the image forming apparatus 10. The external apparatus 20 preferably has higher processing performance as compared with that of the image forming apparatus 10 corresponding to the sender of the process request. By using a computer having a higher processing performance than the image forming apparatus 10 as the external apparatus 20 and requesting the external apparatus 20 to execute a part or all of the image process to be executed with respect to image data input to the image forming apparatus 10, the processing time of the image process may be reduced as compared with the case of having the image forming apparatus 10 perform the entire image process. Note that in some embodiments, the external apparatus 20 may be another image forming apparatus 10 that is different from the image forming apparatus 10 that has made the process request. Even in such a case, the external apparatus 20 is preferably an image forming apparatus 10 that has higher processing performance than the image forming apparatus 10 that has made the process request. Also, in some embodiments, the external apparatus 20 may be a computer or a computer system that provides cloud services or web services or acts as an application provider that provides various services, for example. Also, in some embodiments, the external apparatus 20 may be a computer such as a PC (Personal Computer) or a computer system that is located in the same organization or environment as that in which the image forming apparatus 10 is provided. For example, as illustrated in FIG. 2, the external apparatus 20 may be configured by a plurality of information processing apparatuses that are connected to each other via a network. Note that although FIG. 2 illustrates an example where the external apparatus 20 is configured by four information processing apparatuses, the external apparatus 20 may be configured by three or fewer information processing apparatuses, or the external apparatus 20 may also be configured by five or more information processing apparatuses.

Figure 3:
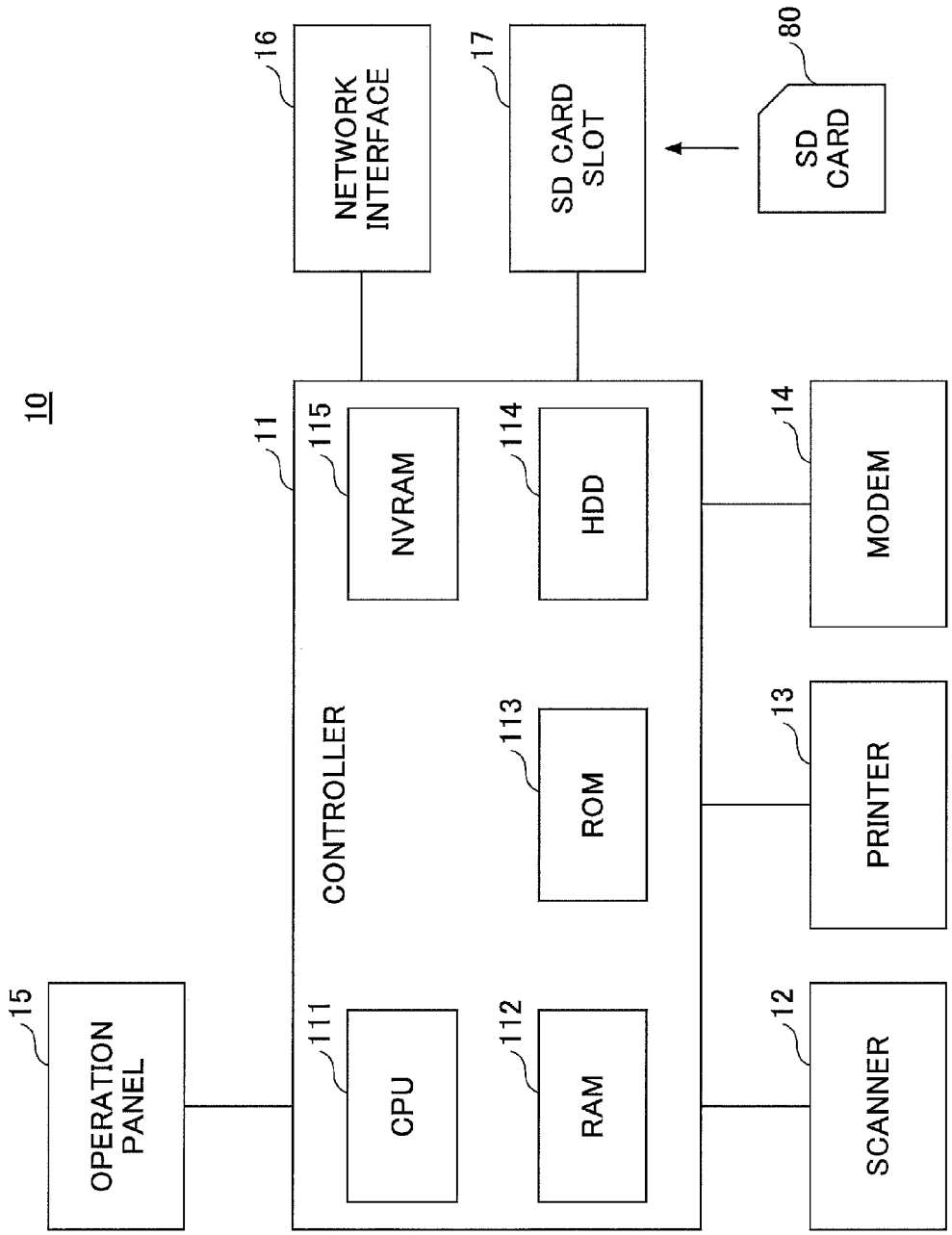
FIG. 3 is a diagram illustrating an exemplary hardware configuration of an image forming apparatus according to the first embodiment.

FIG. 3 is a diagram illustrating an exemplary hardware configuration of the image forming apparatus 10 according to the first embodiment. In FIG. 3, the image forming apparatus 10 includes a controller 11, a scanner 12, a printer 13, a modem 14, an operation panel 15, a network interface 16, and an SD card slot 17 as hardware elements.

The controller 11 includes a CPU (Central Processing Unit) 111, a RAM (Random Access Memory) 112, a ROM (Read-Only Memory) 113, a HDD (Hard Disk Drive) 114, and a NVRAM (Non-Volatile RAM) 115. The ROM 113 stores various programs and data to be used by the various programs, for example. The RAM 112 is used as a storage area for loading a program and as a working area for the loaded program. The CPU 111 executes the program loaded in the RAM 112 to implement various functions. The HDD 114 stores the programs and various data to be used by the programs, for example. The NVRAM 115 stores various setting information.

The scanner 12 is hardware (image scanning unit) for scanning image data from a document. The printer 13 is hardware (print unit) for printing out print data on a print sheet. The modem 14 is hardware for establishing connection with a telephone line and is used to transmit/receive image data via facsimile communication. The operation panel 15 is hardware including an input unit such as a button for accepting a user input and a display unit such as liquid crystal display panel, for example. In some embodiments, the liquid crystal display panel may have a touch panel function. In such case, the liquid crystal display panel may also act as an input unit. The network interface 16 is hardware for establishing connection with a network such as a LAN (which may be wireless or wired). The SD card slot 17 is used to read a program stored in an SD card 80. That is, in the image forming apparatus 10, a program stored in the ROM 113 as well as a program stored in the SD card 80 may be loaded in the RAM 112 and executed. Note that a recording medium other than the SD card 80 such as a CD-ROM or a USB memory may be used instead of the SC card 80. That is, the type of recording medium that may be used to implement the function of the SD card 80 in the image forming apparatus 10 is not particularly limited. In this case, the SD card slot 17 may be replaced by suitable hardware according to the type of recording medium used.

FIG. 4 is a diagram illustrating an exemplary hardware configuration of the external apparatus 20 according to the first embodiment. In FIG. 4, the external apparatus 20 includes a drive device 200, a secondary storage device 202, a memory device 203, a CPU 204, and an interface device 205 that are connected to each other by a bus B.

A program for implementing a process in the external apparatus 20 may be provided by a recording medium 201 such as a CD-ROM. By loading the recording medium 201 storing the program in the drive device 200, the program may be installed in the secondary storage device 202 via the drive device 200. Note, however, that such a program does not necessarily have to be installed from the recording medium 201 and may instead be downloaded from another computer via a network, for example. The secondary storage device 202 stores the installed program, and also stores necessary files and data, for example.

The memory device 203 reads a program from the secondary storage device 202 in response to a program activation instruction, and stores the read program. The CPU 204 implements the functions of the external apparatus 20 according to the program stored in the memory device 203. The interface device 205 is used as an interface for establishing connection with a network.

Note that in some embodiments, the external apparatus 20 may be configured by a plurality of computers having the hardware configuration as illustrated in FIG. 4. That is, one or more processes to be executed by the external apparatus 20 as described below may be distributed to and executed by multiple computers.

In the following, an example in which the external apparatus 20 is requested to execute a part of an image process is described with reference to FIG. 5.

FIG. 5 is a diagram schematically illustrating an image process according to the present embodiment. In the image process illustrated in FIG. 5, first, an image of a paper document is scanned by the scanner 12 of the image forming apparatus 10, and image data of the scanned image (also simply referred to as "scanned image" hereinafter) is generated. The scanned image may be color data in the JPEG (Joint Photographic Experts Group) format, for example. Note, however, that the data format of the scanned image is not limited to a particular format.

Then, an image recognition process is performed on the scanned image. Also, an image conversion process is performed on the scanned image. The image recognition process may be a process that includes analyzing the contents of the image represented by the scanned image and recognizing patterns in the image, for example. The image conversion process may be a process for converting the data size or capacity of image data or a process for converting the data format of image data, for example. Note that the image recognition process and the image conversion process illustrated in FIG. 5 are mutually independent. Thus, the image recognition process and the image conversion process may be performed in parallel. Note, however, that in some embodiments, at least one of the image recognition process and the image conversion process may depend on the other.

Then, a synthesis process is performed with respect to data obtained by the image recognition process and data obtained by the image conversion process. As a result, one electronic document is generated based on the above processed data.

FIG. 6 is a diagram illustrating a specific example of the image process implementing a specific image recognition process and a specific image conversion process. Note that in FIG. 6, an OCR (Optical Character Recognition) process is implemented as a specific example of the image recognition process, and a high-compression PDF conversion process is implemented as a specific example of the image conversion process.

The high-compression PDF conversion process refers to a process of generating high-compression PDF data based on the scanned image. High-compression PDF data refers to processed PDF data that is obtained by separately processing different types of areas such as a colored text area, a black text area, and a picture area to thereby substantially reduce the data size of the PDF data as compared with conventional PDF data while maintaining the visual appearance of the PDF data substantially intact.

The synthesis process utilizes the multilayer structure of PDF data to insert text data obtained by the OCR process into the text layer of the high-compression PDF data as transparent text data. In this way, for example, a word or character search and highlighting may be performed on an electronic document (high-compression PDF with transparent text) that is generated by the synthesis process.

In the present example, the overall processing time of the image process as illustrated in FIG. 5 may be reduced by requesting the external apparatus 20 to execute at least one of the OCR process and the high-compression PDF conversion process. In the following descriptions, it is assumed that the external apparatus 20 is requested to perform the OCR process. In this case, the scanned image has to be transmitted to the external apparatus 20. However, depending on the data size of the scanned image and the communication speed of the network N1 the processing time may not be substantially reduced as expected or desired. Note that the processing time in the case of requesting the external apparatus 20 to perform the OCR process may be calculated based on the following formula (1).

$$\text{Processing Time}(T) = \text{OCR Processing Time }(Tp) + \text{Transmission Time}(Tt) \quad (1)$$

Transmission Time (Tt)=Uploading Time (=Transmission Data Size/Au)+Downloading Time (=Transmission Data Size/Ad)
Au: Uploading Communication Speed
Ad: Downloading Communication Speed Note that the transmission data size of the data uploaded from the image forming apparatus 10 to the external apparatus 20 corresponds to the data size of the scanned image, and the transmission data size of the data downloaded from the external apparatus 20 to the image forming apparatus 20 corresponds to the data size of the resulting data obtained by the OCR process. Note that the transmission time (Tt) is not limited to the uploading time and the downloading time, and may include handshaking time, the time required before starting data transmission, and other time components. However, for the sake of simplifying the present descriptions, it is assumed that the influences of such time components are negligible such that they may be disregarded.

In the following, with respect to the processing time for performing an OCR process per page of a paper document, it is assumed that the image forming apparatus 10 requires a processing time of 10 seconds, and the external apparatus 20 requires a processing time of 1 second. That is, it is assumed that in performing an OCR process, the processing performance of the external apparatus 20 is ten times faster than that of the image forming apparatus 10. Also, it is assumed that the amount of data (data size) of the scanned image is 1 Mbyte, and the amount of data (data size) of text data obtained by the OCR process is 10 Kbyte. Further, it is assumed that the uploading communication speed Au and the downloading communication speed Ad are the same. Under the above conditions, the processing time in the case of requesting the external apparatus 20 to perform the OCR process may be obtained by the following formula (2).

$$\text{Processing Time}=1 \text{ (sec)}+(1 \text{ (Mbyte)}+10 \text{ (Kbyte)})/\text{Communication Speed} \quad (2)$$

Figures 7A, 7B:
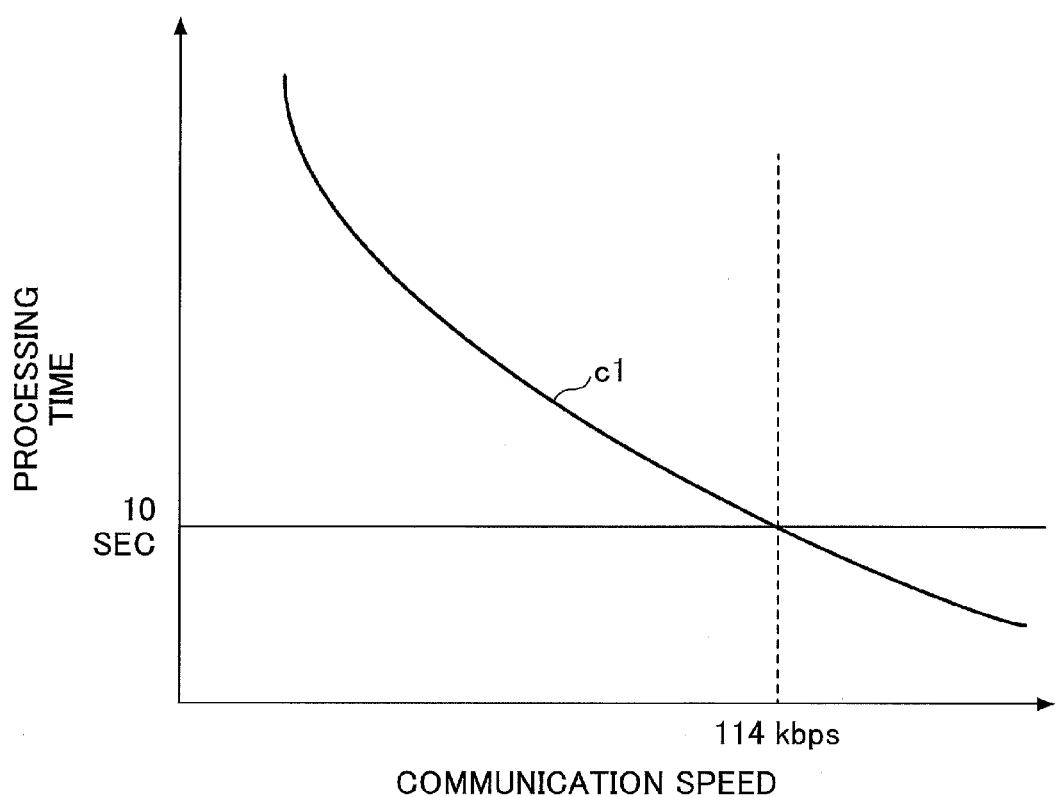
FIGS. 7A and 7B illustrate an exemplary relationship between communication speed and processing time.

FIGS. 7A and 7B illustrate a relationship between the communication speed and the processing time according to the above formula (2). FIG. 7A is a table and FIG. 7B is a graph illustrating the relationship between the communication speed and the processing time according to formula (2). Note that in the graph of FIG. 7B, curve c1 represents the relationship between the communication speed and the processing time according to formula (2).

The processing time for the image forming apparatus 10 to perform an OCR process per page is 10 seconds. Also, the image forming apparatus 10 would require substantially no transmission time in performing the OCR process such that the transmission time may be assumed to be 0 seconds. Thus, in the present example, the overall processing time can be reduced by having the external apparatus 20 perform the OCR process if the communication speed exceeds 114 Kbps.

The present embodiment is directed to increasing the possibility of reducing the overall processing time required for performing an OCR process by having the external apparatus 20 perform the OCR process by lowering the above threshold (114 Kbps) for the communication speed. For example, if the amount of data (data size) of transmission data transmitted to the external apparatus 20 in the above example can be reduced to one-tenth, the processing time in the case of having the external apparatus 20 perform the OCR process may be obtained by the following formula (3).

$$\text{Processing Time}=1 \text{ (sec)}+(100 \text{ (Kbyte)}+(\text{Kbyte}))/\text{Communication Speed} \quad (3)$$

Figures 8A, 8B:
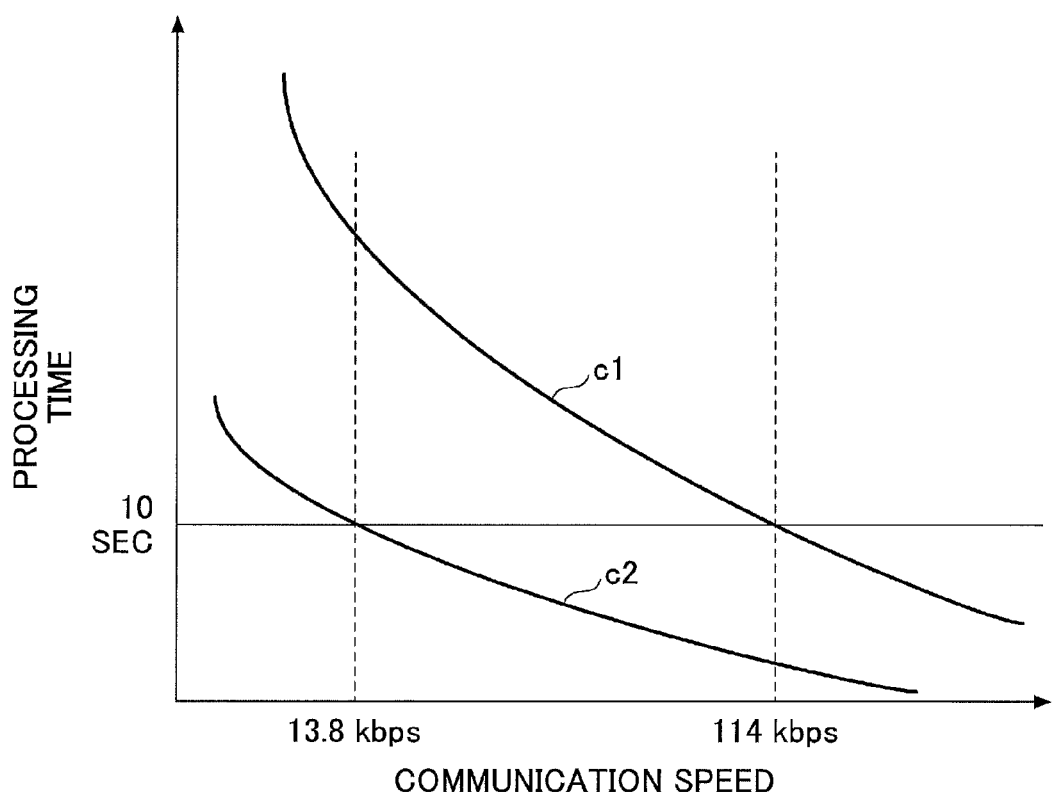
FIGS. 8A and 8B illustrate another exemplary relationship between communication speed and processing time.

FIGS. 8A and 8B illustrate the relationship between the communication speed and the processing time according to formula (3). FIG. 8A is a table and FIG. 8B is a graph illustrating the relationship between the communication speed and the processing time according to formula (3). In the graph of FIG. 8B, curve c2 corresponds to formula (3), and curve c1 corresponds to formula (2). As can be appreciated from FIG. 8B, the overall processing time required for performing the OCR process may be reduced by having the external apparatus 20 perform the OCR process if the communication speed exceeds 13.8 Kbps. That is, by reducing the amount of data transmitted to the external apparatus 20, the possibility of reducing the processing time for performing the OCR process by having the external apparatus 20 perform the OCR process may be increased. Accordingly, in the present embodiment, the external apparatus 20 is requested to perform the OCR process as illustrated in FIG. 5 according to process procedures as illustrated in FIG. 9.

FIG. 9 is a diagram schematically illustrating a process of requesting the external apparatus 20 to perform an OCR process according to the first embodiment. In FIG. 9, the OCR process is performed by the external apparatus 20. Also, in the image forming apparatus 10, a data reduction process is performed before the OCR process. The data reduction process refers to a process of generating reduced image data (hereinafter referred to as "reduced data") by removing some or all information included in the scanned image that is unnecessary for the external apparatus 20 to perform a requested process (i.e., OCR process in the present example). Because a part of the information included in the scanned image is removed in the reduced data, the reduced data has a smaller data size than the scanned image. Therefore, by transmitting the reduced data generated by the data reduction process as transmission data, the possibility of reducing the processing time for performing the OCR process by having the external apparatus 20 perform the OCR process may be increased.

Figure 10:
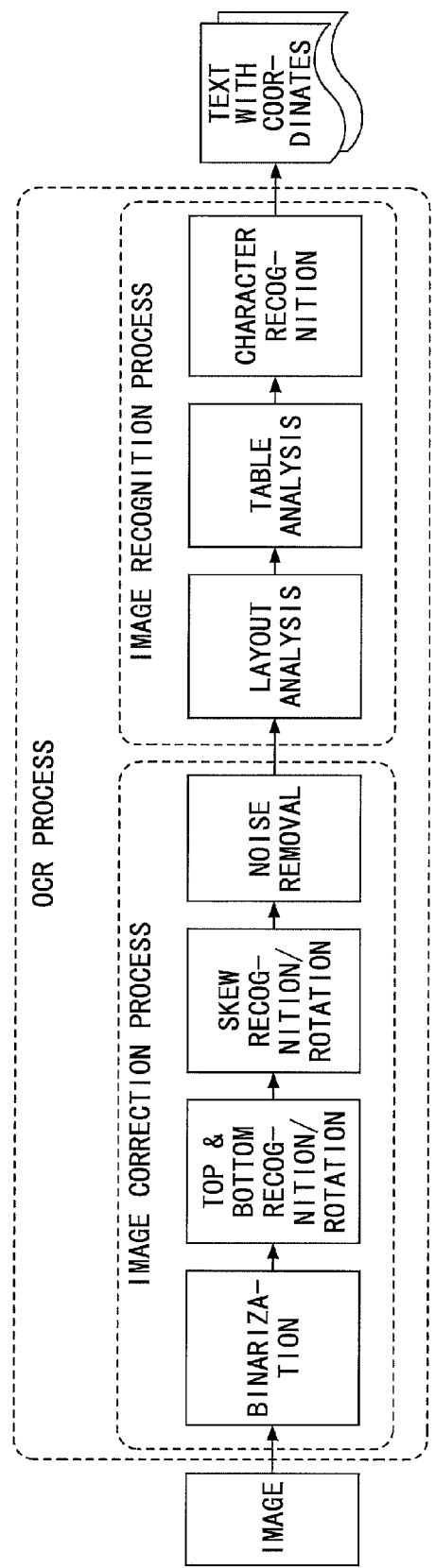
FIG. 10 is a diagram illustrating exemplary process procedures of the OCR process.

In the following, the OCR process is described in greater detail in order to describe the data reduction process. FIG. 10 is a diagram illustrating exemplary process procedures of the OCR process. The OCR process is an image process that inputs image data and outputs text data with coordinates as output data. As illustrated in FIG. 10, the OCR process includes an image correction process and an image recognition process.

The image correction process may be, for example, a process of correcting the input image data in preparation for OCR processing. The process procedures of the image correction process may include, for example, a binarization process, a top & bottom recognition/rotation process, a skew recognition/rotation process, and a noise removal process that are performed in this order.

The binarization process is a process for generating a black and white image that is suitable for OCR processing. The top & bottom recognition/rotation process is a process for determining the top and bottom of the black and white image and correcting the orientation of the black and white image. The skew recognition/rotation process is a process for analyzing the skewing/distortion of characters and lines in the image, and correcting the characters and lines accordingly. The noise removal process is a process for removing noise such as dirt that was attached to the paper document upon being scanned, noise included at the time of scanning the paper document, and shading patterns around characters, for example.

The image recognition process is a process for classifying elements of an image (image generated by the image correction process) into characters, figures, pictures, tables, and the like, and performing character recognition on the characters. Process procedures of the image recognition process may include, for example, a layout analysis process, a table analysis process, and a character recognition process that are executed in this order.

The layout analysis process is a process for extracting a character area, a table area, a line area, a figure area, and the like within the image. The table analysis process is a process for extracting a character area or line information within the table area. The character recognition process is a process for cutting out each character within the character area and recognizing each of character.

As can be appreciated from the above, in the processes after the binarization process, the black and white image obtained by the binarization process is subject to processing. In other words, a color image is not required in the processes after the binarization process. Because the number of gray levels in a color image and a black and white image are different with respect to the same image content, the amount of data (data size) of the black and white image is smaller than that of a corresponding color image representing the same image content. Thus, when the data of the black and white image generated by the binarization process is used as transmission data to be transmitted to the external apparatus 20, the transmission time may be reduced as compared with the case of transmitting the scanned image.

Figure 11:
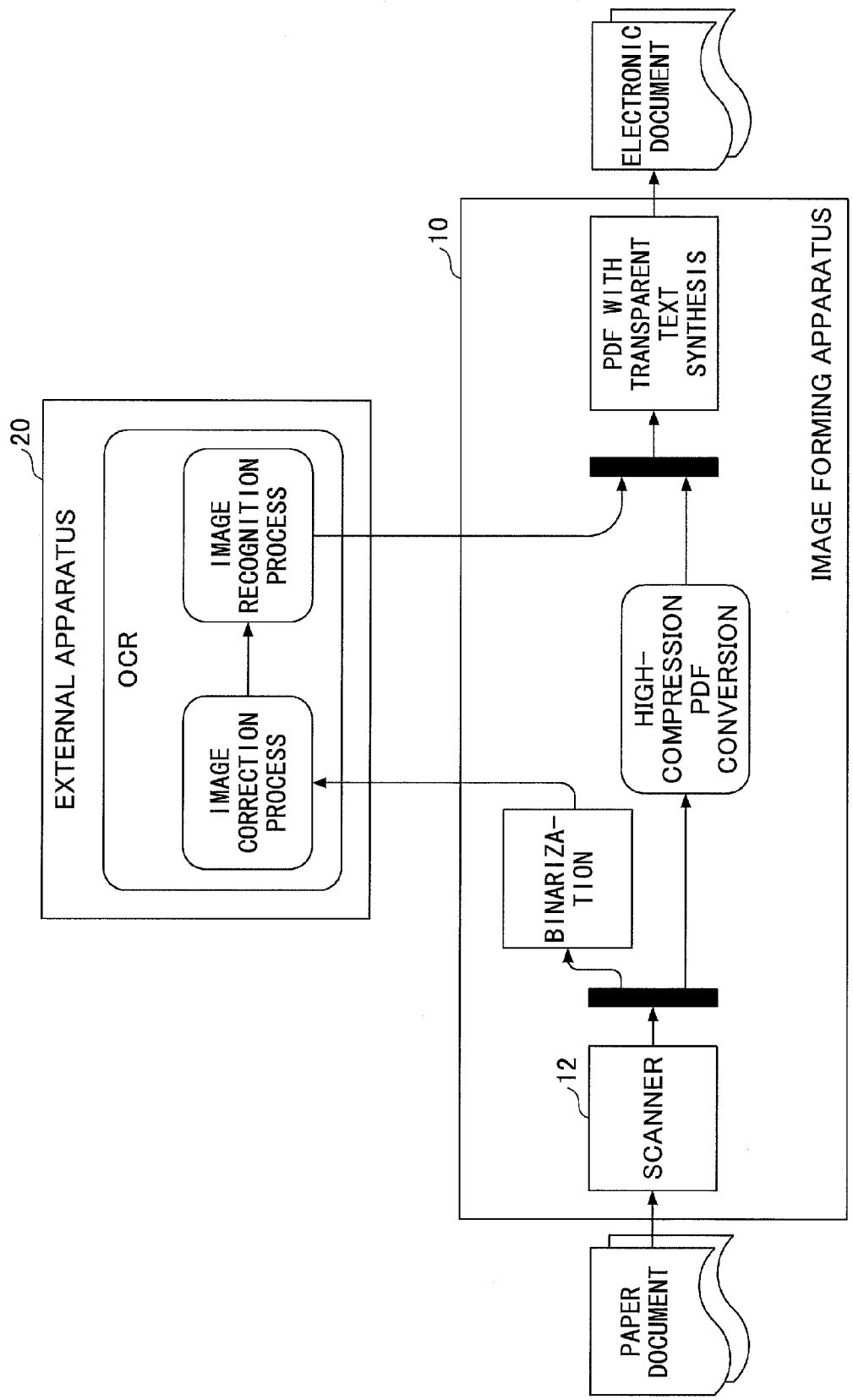
FIG. 11 is a diagram illustrating a specific example of the process of requesting the external apparatus to perform the OCR process according to the first embodiment.

Accordingly, in the present embodiment, the external apparatus 20 may be requested to perform the processes after the binarization process as illustrated in FIG. 11. FIG. 11 is a diagram illustrating a specific example of requesting the external apparatus 20 to perform the OCR process according to the first embodiment. Note that FIG. 11 illustrates a specific example of the process illustrated in FIG. 9.

In FIG. 11, the image forming apparatus 10 performs a binarization process on the scanned image. Image data of the black and white image generated by the binarization process is transmitted to the external apparatus 20. That is, in the present embodiment, the binarization process is an example of the data reduction process. The image data of the black and white image generated by the binarization process is an example of reduced data.

The external apparatus 20 performs the image correction process and the image recognition process of the OCR process with respect to the reduced data transmitted from the image forming apparatus 10. Note, however, that in the image correction process, the binarization process does not have to be executed because the binarization process is executed by the image forming apparatus 10. The external apparatus 20 generates text data with coordinates by the OCR process, and returns to the generated text data with coordinates to the image forming apparatus 10.

The image forming apparatus 10 generates high-compression PDF data by performing a high-compression PDF conversion process, and synthesizes the generated high-compression PDF data and the text data with coordinates to generate high-compression PDF data with transparent text.

The text data with coordinates generated by the OCR process may have a configuration as illustrated in FIG. 12, for example. FIG. 12 illustrates an example of text data with coordinates.

In FIG. 12, the text data with coordinates may include a title field f1, a resolution field f2, a size field f3, and a rotation angle field f4, for example.

The title field f1 includes a character string representing a title portion of the image from which the text data is extracted. The title portion within the image may be identified based on the size of the recognized characters, for example. The resolution field f2 includes the resolution of the image from which the text data is extracted. The size field f3 includes the number of pixels in the width direction and the number of pixels in the height direction of the image from which the text data is extracted. The rotation angle field f4 includes the orientation of the image from which the text data is extracted.

In the text data with coordinates illustrated in FIG. 12, after the fields f1-f4, coordinate values of a rectangle surrounding the periphery of each recognized character are listed in association with the corresponding recognized character.

In the present embodiment, the data format of the text data with coordinates is not particularly limited as long as it contains the information necessary for inserting the text data into the text layer of the high-compression PDF data. For example, the coordinate values of each character may be used to identify the location of each character within the text layer of the high-compression PDF data.

Figure 13:
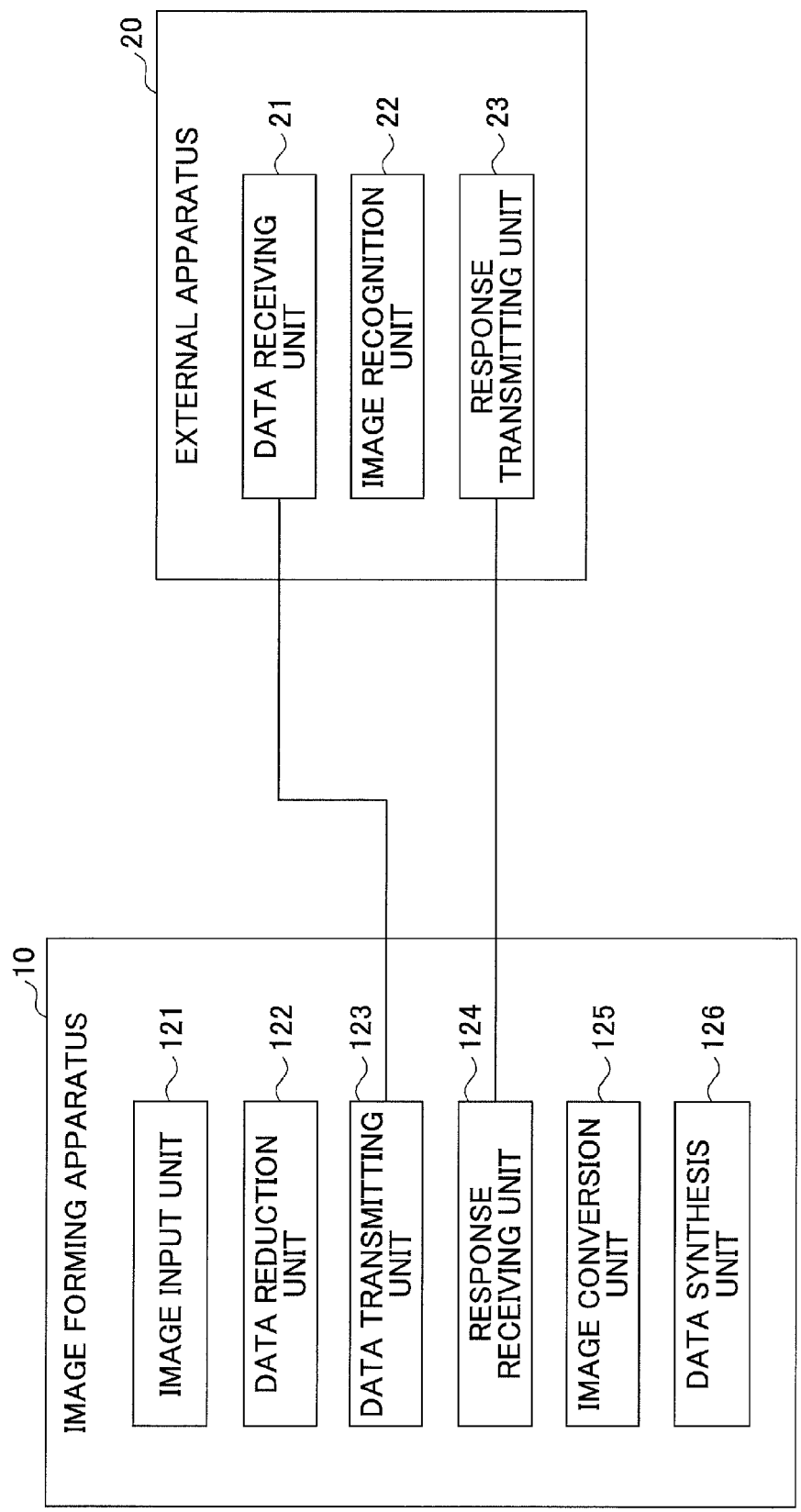
FIG. 13 is a diagram illustrating exemplary functional configurations of the image forming apparatus and the external apparatus according to the first embodiment.

To implement the process for requesting the external apparatus 20 to perform the OCR process as illustrated in FIG. 11, the image forming apparatus 10 and the external apparatus 20 may have functional configurations as illustrated in FIG. 13, for example.

FIG. 13 is a diagram illustrating exemplary functional configurations of the image forming apparatus 10 and the external apparatus 20 according to the first embodiment. In FIG. 13, the image forming apparatus 10 includes an image input unit 121, a data reduction unit 122, a data transmitting unit 123, a response receiving unit 124, an image conversion unit 125, and a data synthesis unit 126. These component elements may be implemented by the CPU 111 executing one or more programs that are installed in the image forming apparatus 10, for example.

The image input unit 121 prompts the scanner 12 to scan an image of a paper document to generate image data (scanned image). That is, the image input unit 121 inputs the scanned image to the image forming apparatus 10. The scanned image may be a color image. The data reduction unit 122 performs a binarization process with respect to the scanned image to generate image data of a black and white image (reduced data) of the scanned image. Note that the binarization process is one of a plurality of process steps constituting the OCR process. The data transmitting unit 123 transmits the reduced data to the external apparatus 20. The response receiving unit 124 receives a result of performing the OCR process on the reduced data (i.e., text data with coordinates) from the external apparatus 20. The image conversion unit 125 performs a high-compression PDF conversion process with respect to the scanned image to generate high-compression PDF data. The data synthesis unit 126 synthesizes text data with coordinates and the high-compression PDF data.

The external apparatus 20 includes a data receiving unit 21, an image recognition unit 22, and a response returning unit 23. These component elements may be implemented by the CPU 204 executing one or more programs that are installed in the external apparatus 20, for example.

The data receiving unit 21 receives the reduced data transmitted from the image forming apparatus 10. The image recognition unit 22 performs an OCR process on the reduced data to generate text data with coordinates. The response returning unit 23 returns the text data with coordinates to the image forming apparatus 10.

Figure 14:
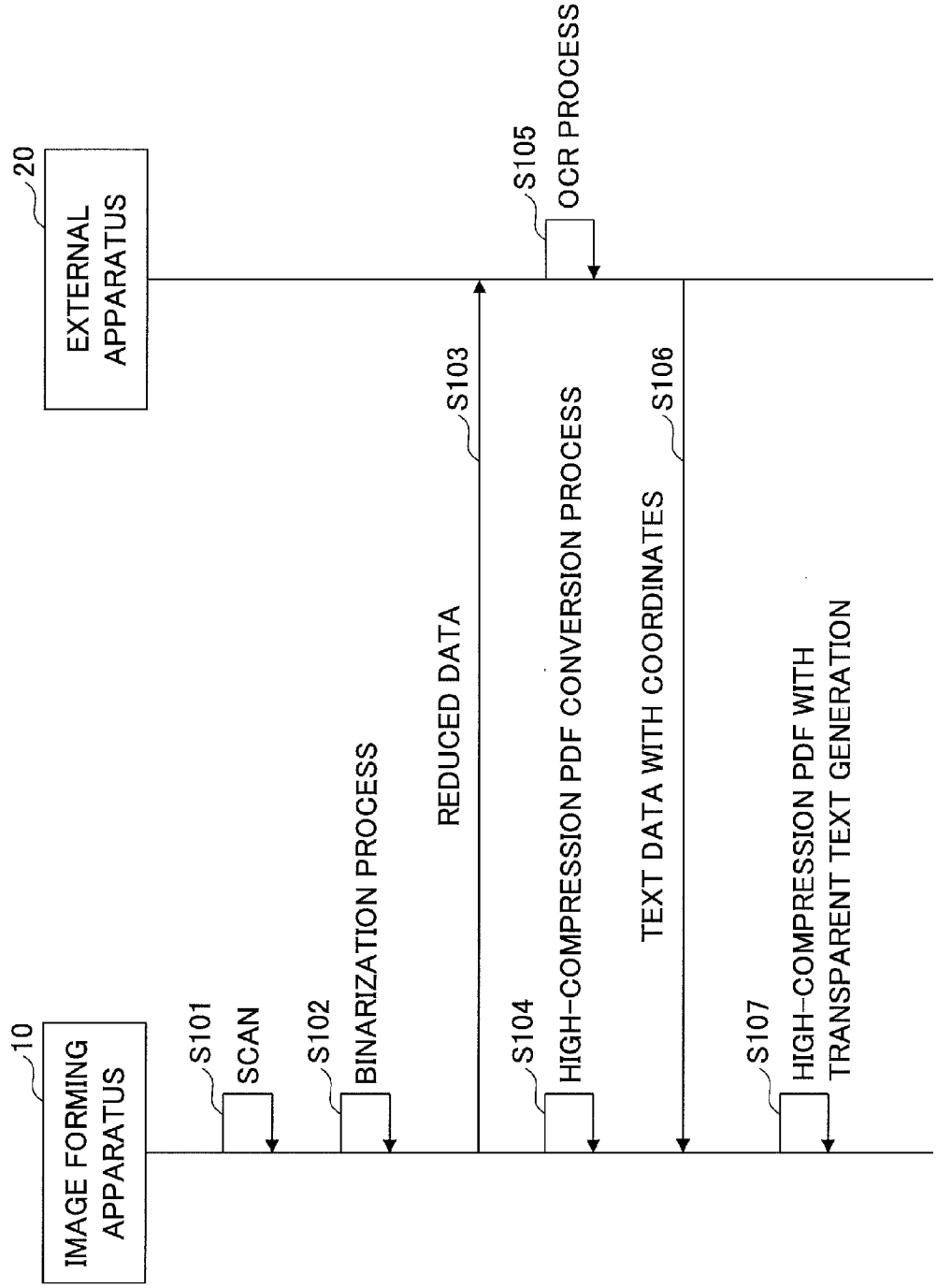
FIG. 14 is a sequence chart illustrating exemplary process procedures implemented by the information processing system according to the first embodiment.

In the following, process procedures implemented by the information processing system 1 are described. FIG. 14 is a sequence chart illustrating exemplary process procedures of the information processing system 1 according to the first embodiment.

When a paper document is set to the image forming apparatus 10, and a predetermined operation is performed by a user, the image input unit 121 controls the scanner 12 to scan an image of the paper document (step S101). The image input unit 121 generates a scanned image representing the image of the paper document.

Then, the data reduction unit 122 executes a binarization process with respect to the scanned image to generate image data of a black and white image of the scanned image as reduced data (step S102). Then, the data transmitting unit 123 transmits the reduced data to the external apparatus 20 (step S103).

Then, the image conversion unit 125 performs a high-compression PDF conversion process with respect to the scanned image and generates a high-compression PDF data of the scanned image (step S104). Then, the data synthesis unit 126 waits for a response from the external apparatus 20.

Meanwhile, in the external apparatus 20, when the data receiving unit 21 receives the reduced data, the image recognition unit 22 performs an OCR process with respect to the reduced data (step S105). Note that when performing the OCR process, the binarization process may be omitted. As a result of the OCR process, text data with coordinates is generated. The text data with coordinates includes characters extracted from a character area of the image represented by the reduced data. The text data with coordinates also includes corresponding coordinate values of each of the characters. Then, the response returning unit 23 returns the text data with coordinates to the image forming apparatus 10 (step S106).

Upon receiving the text data with coordinates from the external apparatus 20, the data synthesis unit 126 synthesizes the text data with coordinates and the high-compression PDF data generated in step S104 (step S107). That is, the data synthesis unit 126 inserts the characters included in the text data with coordinates into the text layer of the high-compression PDF data. The insertion position of each character may be determined based on the coordinate values included in the text data with coordinates.

Note that the execution order of steps S102-106 is not particularly limited. For example, step S106 may be executed while step S104 is executed. In this case, the data synthesis unit 126 may wait until step S104 is completed and then execute step S107. Also, step S104 may be executed before step S103. In this case, step S104 may be executed in parallel with step S102.

As described above, according to the first embodiment, reduced data that is generated by removing information that is unnecessary for the external apparatus 20 in performing a requested OCR process is transmitted to the external apparatus 20. In this way, influences of the communication speed of the network N1 on the process of requesting the external apparatus 20 to perform an image process may be reduced. Thus, there may be an increased possibility of reducing the processing time required for performing an OCR process by having the external apparatus 20 perform the OCR process rather than the image forming apparatus 10.

Also, in the present embodiment, the data reduction process for generating reduced data corresponds to one of the plurality of process steps constituting the OCR process such as the binarization process. That is, the binarization process is a part of the OCR process that may be performed on the scanned image regardless of whether the external apparatus 20 is requested to perform the OCR process. As such, the amount of calculations within the overall information processing system 1 may not be substantially increased as a result of performing the data reduction process. In this way, the effect of reducing the data transmission time may be prevented from being compromised by the influences of the data reduction process, for example.

Note that the image conversion process performed by the image forming apparatus 10 does not necessarily have to be a high-compression PDF conversion process. For example, the image conversion process may be a PDF data conversion process.

Figure 15:
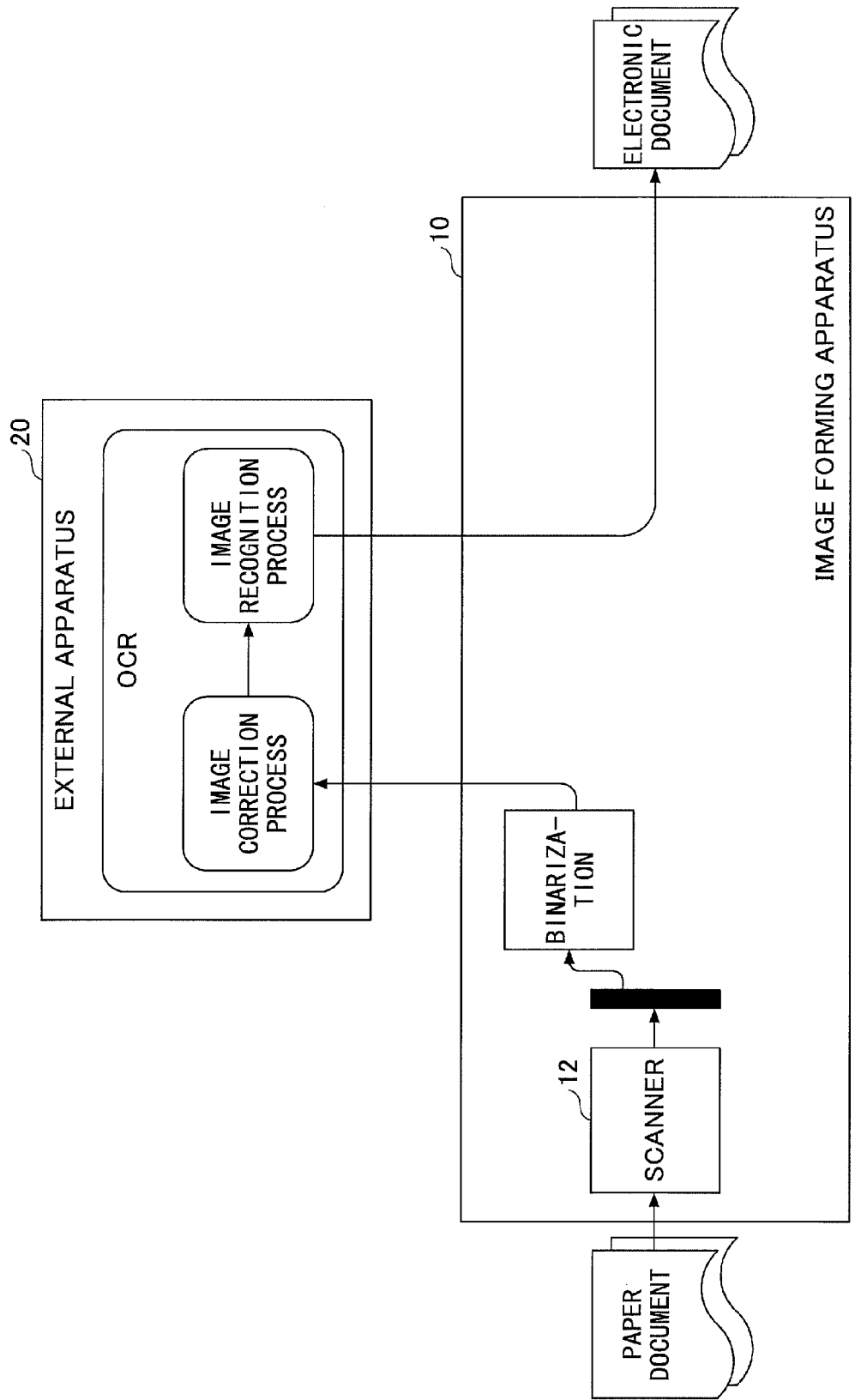
FIG. 15 is a diagram illustrating an example in which an image conversion process and a synthesis process are not performed by the image forming apparatus.

Also, in some embodiments, the image conversion process and the synthesis process do not have to be performed by the image forming apparatus 10. FIG. 15 illustrates an embodiment in which the image conversion process and the synthesis process are not performed by the image forming apparatus 10. In FIG. 15, the image forming apparatus 10 does not perform the high-compression PDF conversion process and the synthesis process. The image forming apparatus 10 outputs the text data with coordinates returned by the external apparatus 20 or character string data included in the text data with coordinates as a final product (as an electronic document in FIG. 15). In the embodiment illustrated in FIG. 15, the user may be able to promptly obtain an OCR result with respect to the paper document.

Also, in a case where delivery of the final product is performed by the external device 20, the synthesis process may be performed by the external apparatus 20, for example.

Figure 16:
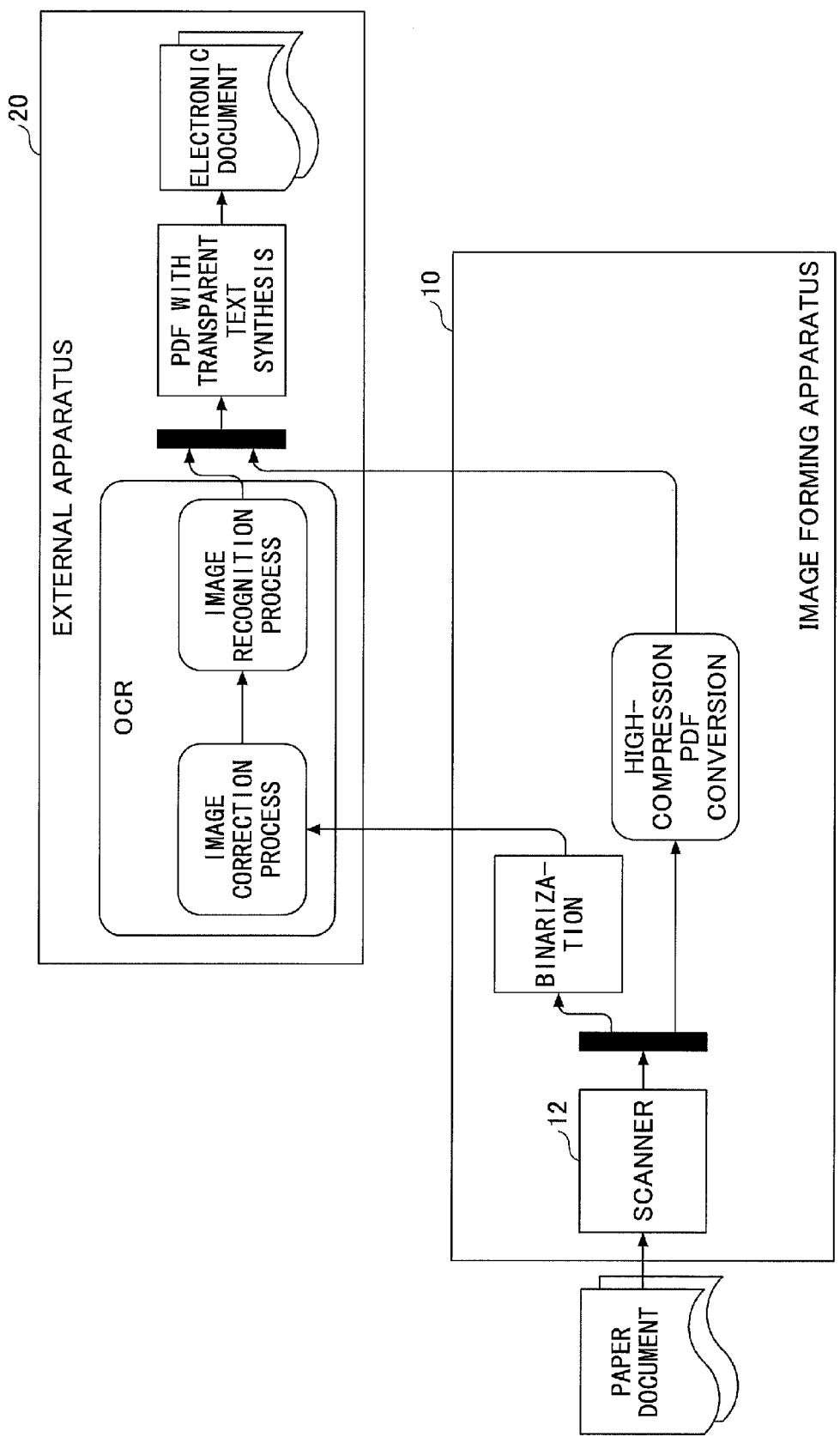
FIG. 16 is a diagram illustrating an example in which the synthesis process is performed by the external apparatus.

FIG. 16 illustrates an embodiment in which the synthesis process is performed by the external apparatus 20. In FIG. 16, the data transmitting unit 123 of the image forming apparatus 10 transmits the high-compression PDF data generated by the image conversion unit 125 to the external apparatus 20. Note that the high-compression PDF data may be transferred together with the reduced data generated by the data reduction unit 122, or they may be separately transmitted (e.g., at their respective generation timings).

The external apparatus 20 generates high-compression PDF data with transparent text by synthesizing the text data with coordinates generated by the OCR process and the high-compression PDF data transmitted from the image forming apparatus 10. Note that in the embodiment of FIG. 16, the image forming apparatus 10 does not have to include the data synthesis unit 126. Instead, the external apparatus 20 includes the data synthesis unit 126. The external apparatus 20 may deliver the generated high-compression PDF data with transparent text to a predetermined destination, for example. The predetermined destination may be determined based on information input to the image forming apparatus 10 by the user upon prompting the image forming apparatus 10 to scan the paper document, for example.

Also, in the embodiment of FIG. 16, the data generated by the image conversion unit 125 does not have to be high-compression PDF data and may be PDF data, for example.

In the following, a second embodiment of the present invention is described. Note that the following descriptions relate to features of the second embodiment that differ from those of the first embodiment. Accordingly, it may be assumed that features of the second embodiment that are not specifically mentioned below may be substantially identical to the first embodiment.

Figure 17:
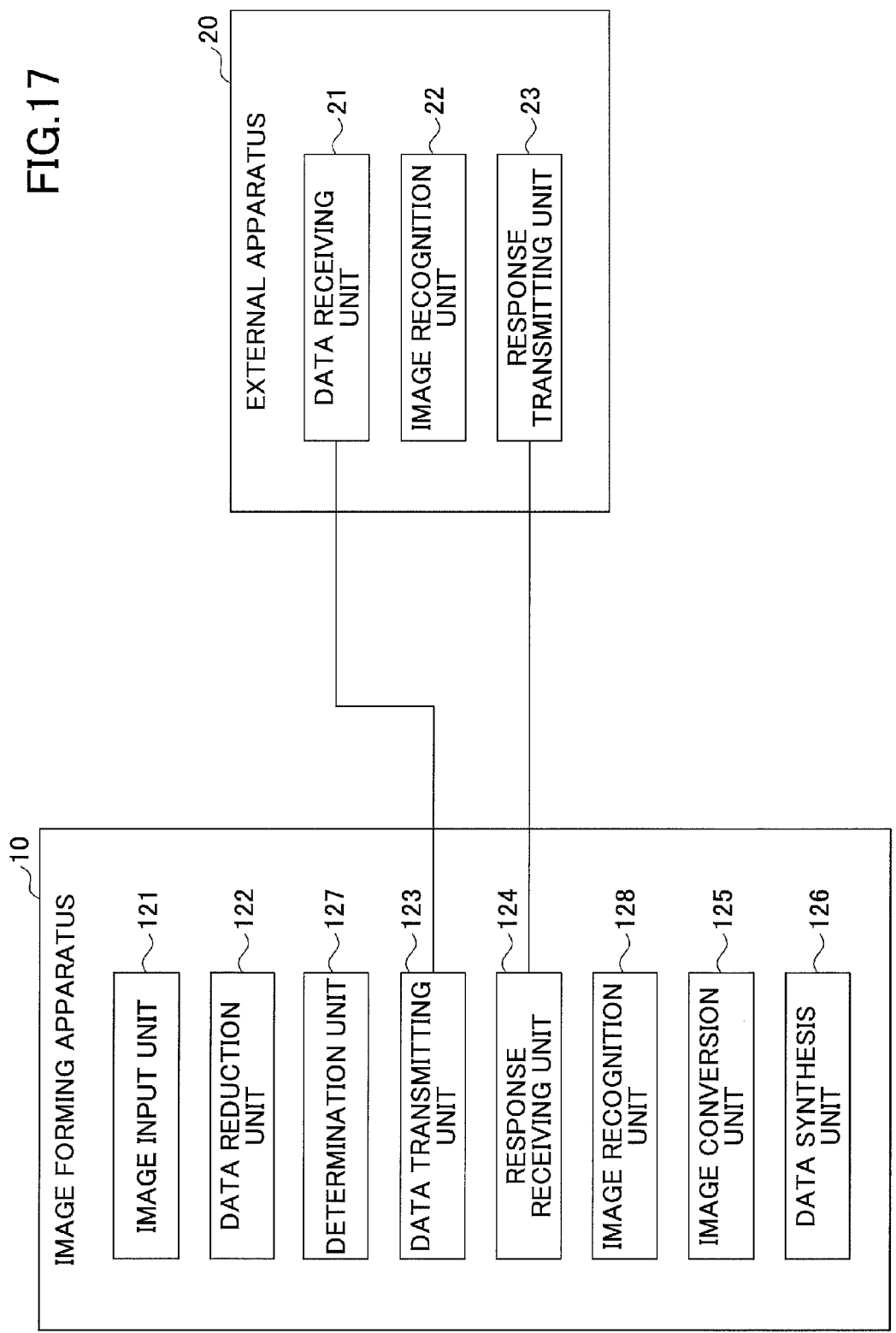
FIG. 17 is a diagram showing exemplary functional configurations of the image forming apparatus and the external apparatus according to a second embodiment of the present invention.

FIG. 17 is a diagram illustrating exemplary functional configurations of the image forming apparatus 10 and the external apparatus 20 according to the second embodiment. In FIG. 17, component elements that are identical to those illustrated in FIG. 13 are given the same reference numerals and descriptions thereof are omitted.

In FIG. 17, the image forming apparatus 10 further includes a determination unit 127 and an image recognition unit 128. These component elements may be implemented by the CPU 111 executing one or more programs that are installed in the image forming apparatus 10, for example.

The determination unit 127 determines whether to request the external apparatus 20 to perform an OCR process. For example, the determination unit 127 may determine whether to request the external apparatus 20 to perform the OCR process based on the communication speed of the network N1, and the data size of the reduced data, the estimated processing time of the OCR process by the image recognition unit 22, and the estimated processing time of the OCR process by the image recognition unit 128.

The image recognition unit 128 performs the OCR process except for the binarization process. Note that the image recognition unit 128 may be implemented by a program that is identical to that used for implementing the image recognition unit 22, for example.

Figure 18:
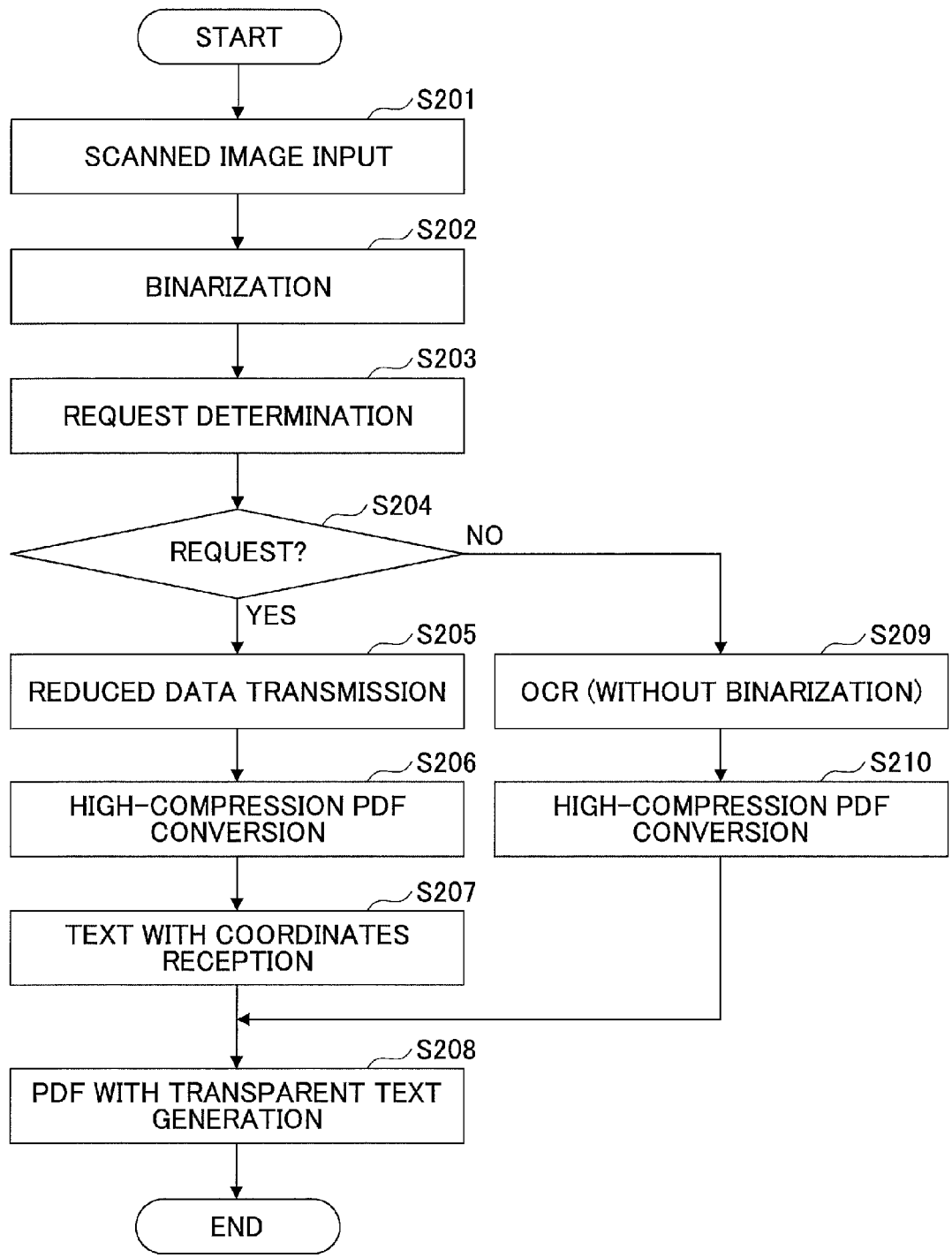
FIG. 18 is a flowchart illustrating exemplary process procedures implemented the image forming apparatus according to the second embodiment.

FIG. 18 is a flowchart illustrating exemplary process procedures implemented by the image forming apparatus 10 according to the second embodiment.

Note that steps S201 and S202 of FIG. 18 are substantially identical to steps S101 and S102 of FIG. 14. After step S202, the determination unit 127 determines whether to request the external apparatus 20 to perform the OCR process (step S203). For example, based on the data size of the reduced data generated in step S202, the estimated data size of the text data with coordinates to be generated by the OCR process, the communication speed of the network N1, the estimated processing time of the OCR process by the image recognition unit 22, and the estimated processing time of the OCR process by the image recognition unit 128, the determination unit 127 may determine whether the processing time can be reduced by requesting the external apparatus 20 to perform the OCR process. If the processing time can be reduced, the determination unit 127 determines that the request should be made to the external apparatus (step 204, YES). If not, the request determination unit 127 determines that the request should not be made to the external apparatus 20 (step S204, NO). Note that such a determination may be made based on the above formula (2) or (3) and the relationship between the communication speed and the processing time as illustrated in FIGS. 7A and 7B or FIGS. 8A and 8B, for example.

That is, the communication speed of the network N1, the data size of the reduced data, the estimated data size of the text data with coordinates to be generated by the OCR process, and the estimated processing time of the OCR process by the image recognition unit 22 may be plugged into formula (2) or formula (3), and the processing time calculated therefrom may be compared with the estimated processing time of the OCR process by the image recognition unit 128 to determine whether to request the external apparatus 20 to perform the OCR process.

Note that the communication speed of the network N1 may be measured while scanning is taking place, or the communication speed of the network N1 may be measured in advance and stored in the HDD 114, for example. Also, in some embodiments, fixed values for the estimated data size of the text data with coordinates to be generated by the OCR process, the estimated processing time of the OCR process by the image recognition unit 22, and the estimated processing time of the OCR process by the image recognition unit 128 may be stored in the HDD 114, for example. In other embodiments, if there is an empirical correlation between the data size of the reduced data and the above estimated processing times and data size of the text data with coordinates, corresponding values for the estimated processing times and the estimated data size of the text data with coordinates may be calculated by plugging in the data size of the reduced data into a function representing the correlation, for example.

If it is determined that the estimated processing time of the OCR process by the external apparatus 20 is shorter than the estimated processing time of the OCR process by the image recognition unit 128 (step S204, YES), the process proceeds to steps S205-S208. Note that the processes of steps S205-S208 are substantially identical to steps S103, S104, S106, and S107 of FIG. 14.

If it is determined that the estimated processing time of the OCR process by the external apparatus 20 is not shorter than the estimated processing time of the OCR process by the image recognition unit 128 (step S204, NO), the image recognition unit 128 performs the OCR process with respect to the reduced data to generate text data with coordinates (step S209). Note that in the case where the OCR process is performed by the image recognition unit 128, the binarization process may be omitted. Then, the image conversion unit 125 performs a high-compression PDF conversion process with respect to the scanned image to generate high-compression PDF data (step S210). Note that the execution order of steps S209 and S210 is not particularly limited. Then, the data synthesis unit 126 synthesizes the text data with coordinates generated in step S209 and the high-compression PDF data generated in step S210 to generate high-compression PDF data with transparent text (step S208).

As described above, according to the second embodiment, the OCR process may be performed by the image forming apparatus 10 when it is determined that the processing time of the OCR process would be shorter if the OCR process were performed by the image forming apparatus 10. In this way, the average processing time of image processes performed on scanned images input to the image forming apparatus 10 may be further reduced. Note that in step S203, when the estimated processing time of the OCR process by the external apparatus 20 and the estimated processing time of the OCR process by the image recognition unit 128 are determined to be the same, a request may still be made to the external apparatus 20 or the request may not be made.

Note that the above-described embodiments may be implemented using a device other than the image forming apparatus 10. For example, a device such as a digital camera, a cell phone with a camera, a smartphone with a camera, a digital video camera, or an electronic blackboard may be utilized in place of the image forming apparatus 10. That is, image data may be input to such a device, and the device may transmit the image data to the external apparatus 20 via a network. Further, other devices that are capable of inputting image data and transmitting the image data via a network may also be used in embodiments of the present invention.

Also, the process to be performed by the external apparatus 20 in response to a request from the image forming apparatus 10 or some other device is not limited to an image recognition process. That is, the external apparatus 20 may be requested to perform some other process.

In the following, examples of image processes other than an OCR process that may be performed by the external apparatus 20 in response to a request are described.

Figure 19:
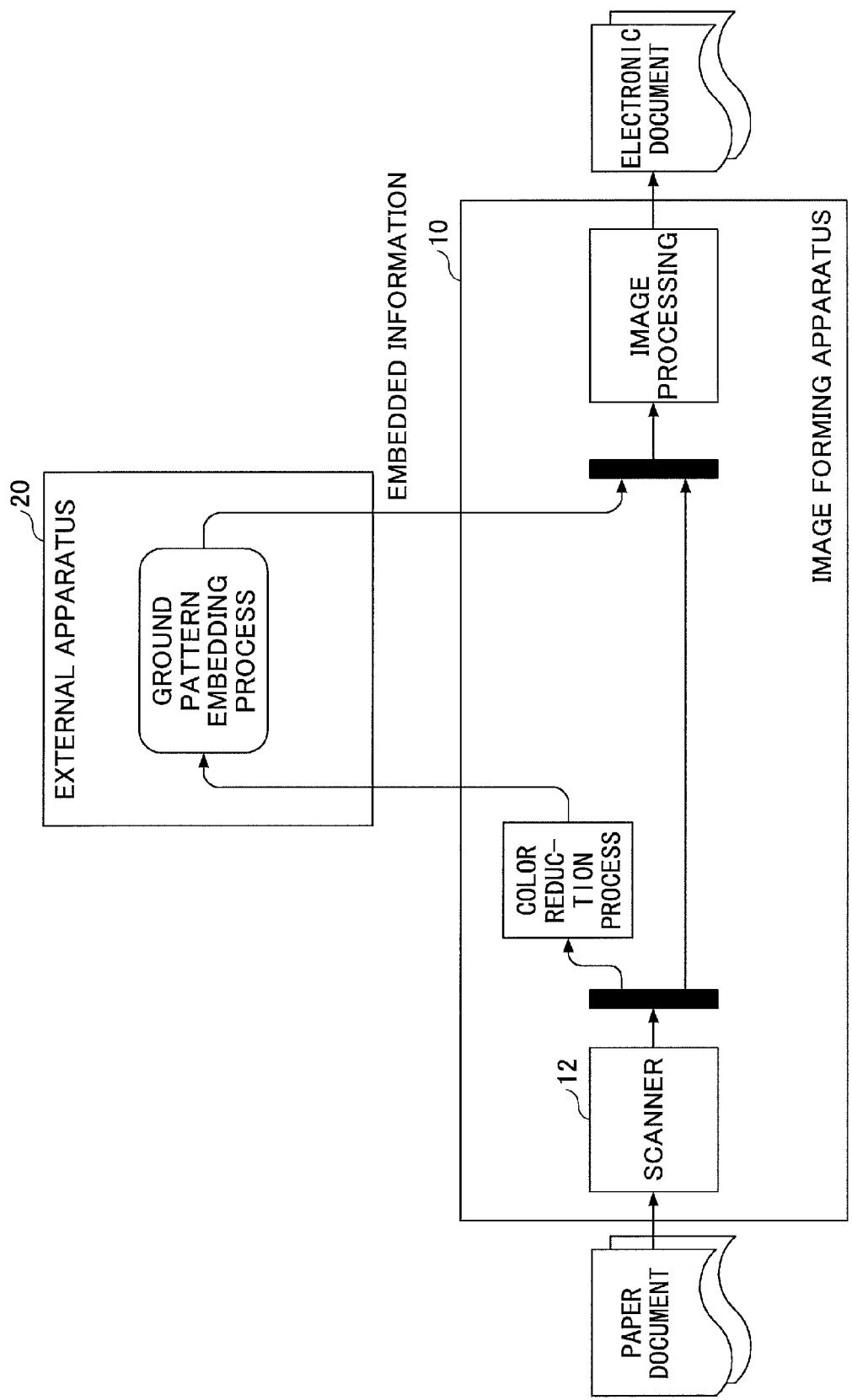
FIG. 19 is a diagram illustrating a first example of requesting the external apparatus to perform another image process.

FIG. 19 is a diagram illustrating a first example of requesting the external apparatus 20 to perform another image process. FIG. 19 illustrates an example in which the external apparatus 20 is requested to perform a background pattern embedding process. The image forming apparatus 10 may perform a color reduction process with respect to image data scanned from a paper document to generated reduced data, for example. The image forming apparatus 10 may then transmit the reduced data that is reduced in data size by the color reduction process to the external apparatus 20. Note that in a color reduction process, the color depth (bpp: bit per pixel) of an image may be reduced to two colors; i.e., black and white. In this way, a black image portion (e.g., layer depicting black) of the image data may be generated as reduced data. The external apparatus 20 may perform a process with respect to the reduced data to generate image data representing a background pattern (background pattern embedding process) and transmit the generated image data of the background pattern to the image forming apparatus 10. Note that in some embodiments, the image data of the background pattern and the reduced data may be synthesized and transmitted to the image forming apparatus 10. The image forming apparatus 10 that receives the image data of the background pattern may synthesize an electronic document by combining the image data of the background pattern and the scanned image, for example.

Figure 20:
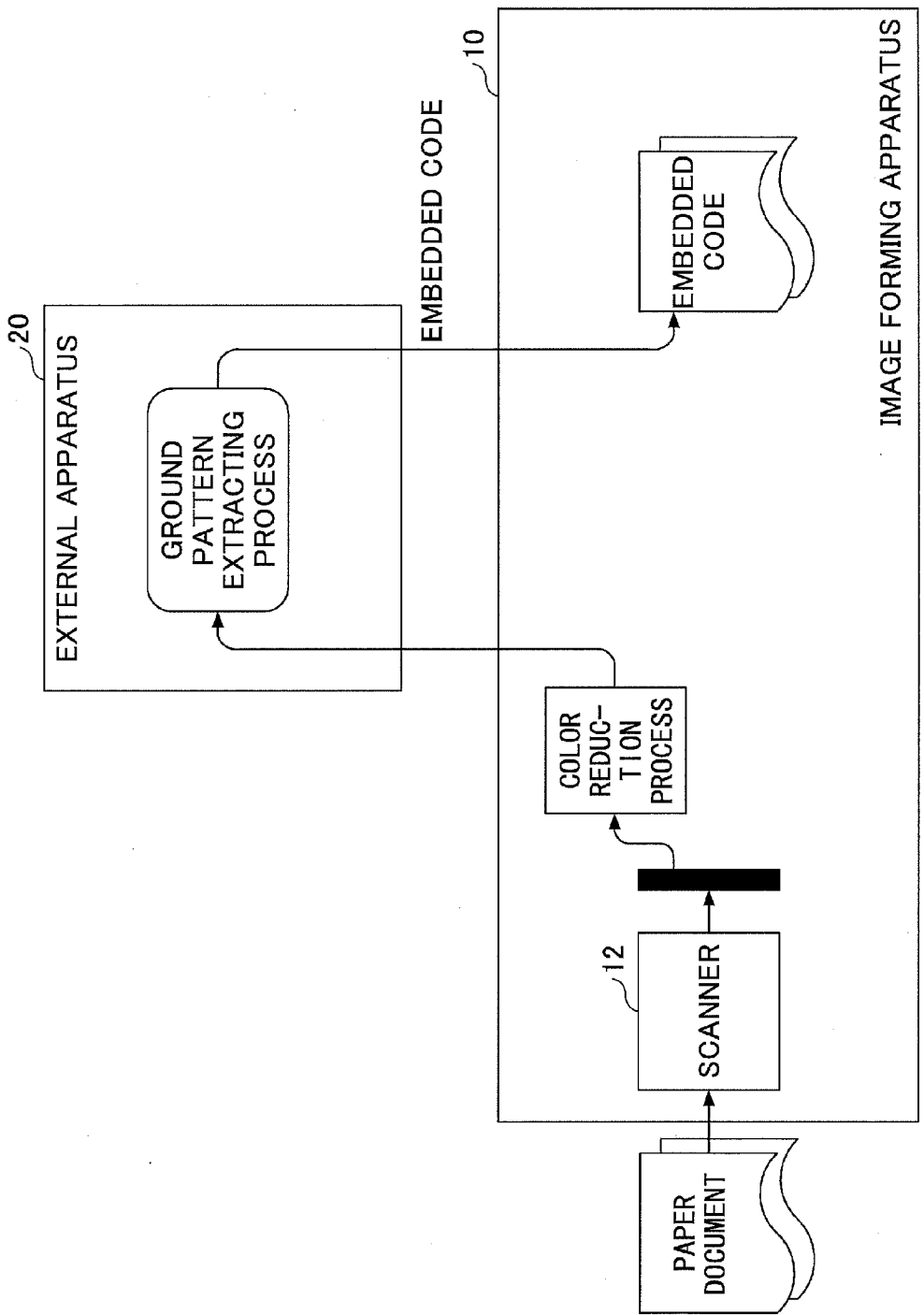
FIG. 20 is a diagram illustrating a second example of requesting the external apparatus to perform another image process.

FIG. 20 is a diagram illustrating a second example of requesting the external apparatus 20 to perform another image process. FIG. 20 illustrates an example in which the external apparatus 20 is requested to perform a process of extracting a background pattern from an image. The image forming apparatus 10 may perform a color reduction process on image data scanned from a paper document to generate reduced data, for example. The image forming apparatus 10 may then transmit the reduced data that is reduced in data size by the color reduction process to the external apparatus 20. The external apparatus 20 may then extract code embedded in a background pattern (embedded code) from the image represented by the reduced data and transmit the extracted embedded code to the image forming apparatus 10. Based on the embedded code, the image forming apparatus 10 may perform processes such as tampering detection and unauthorized copying prevention, for example.

Figure 21:
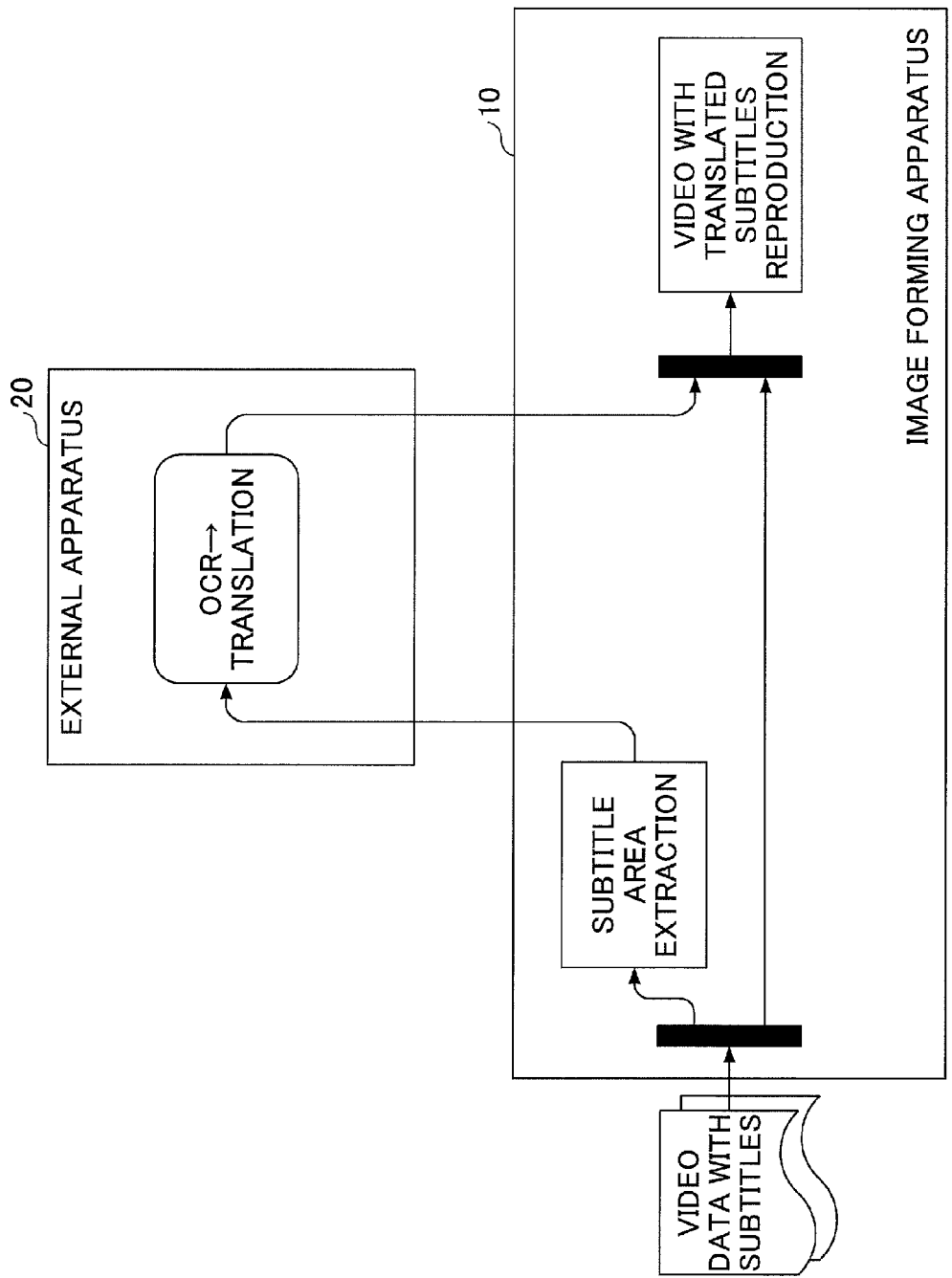
FIG. 21 is a diagram illustrating a third example of requesting the external apparatus to perform another image process.

FIG. 21 is a diagram illustrating a third example of requesting the external apparatus 20 to perform another image process. In the example of FIG. 21, the image forming apparatus 10 extracts a subtitle area of an image upon reproducing video data including subtitles, for example, and transmits image data of the subtitle area as reduced data to the external apparatus 20. The external apparatus 20 performs an OCR process and a translation process with respect to the reduced data and transmits text data obtained by the translation process (translated text data in a language different from the original language) to the image forming apparatus 10. The image forming apparatus 10 then combines the translated text data with the video being reproduced. In this way, video with translated subtitles may be reproduced.

Figure 22:
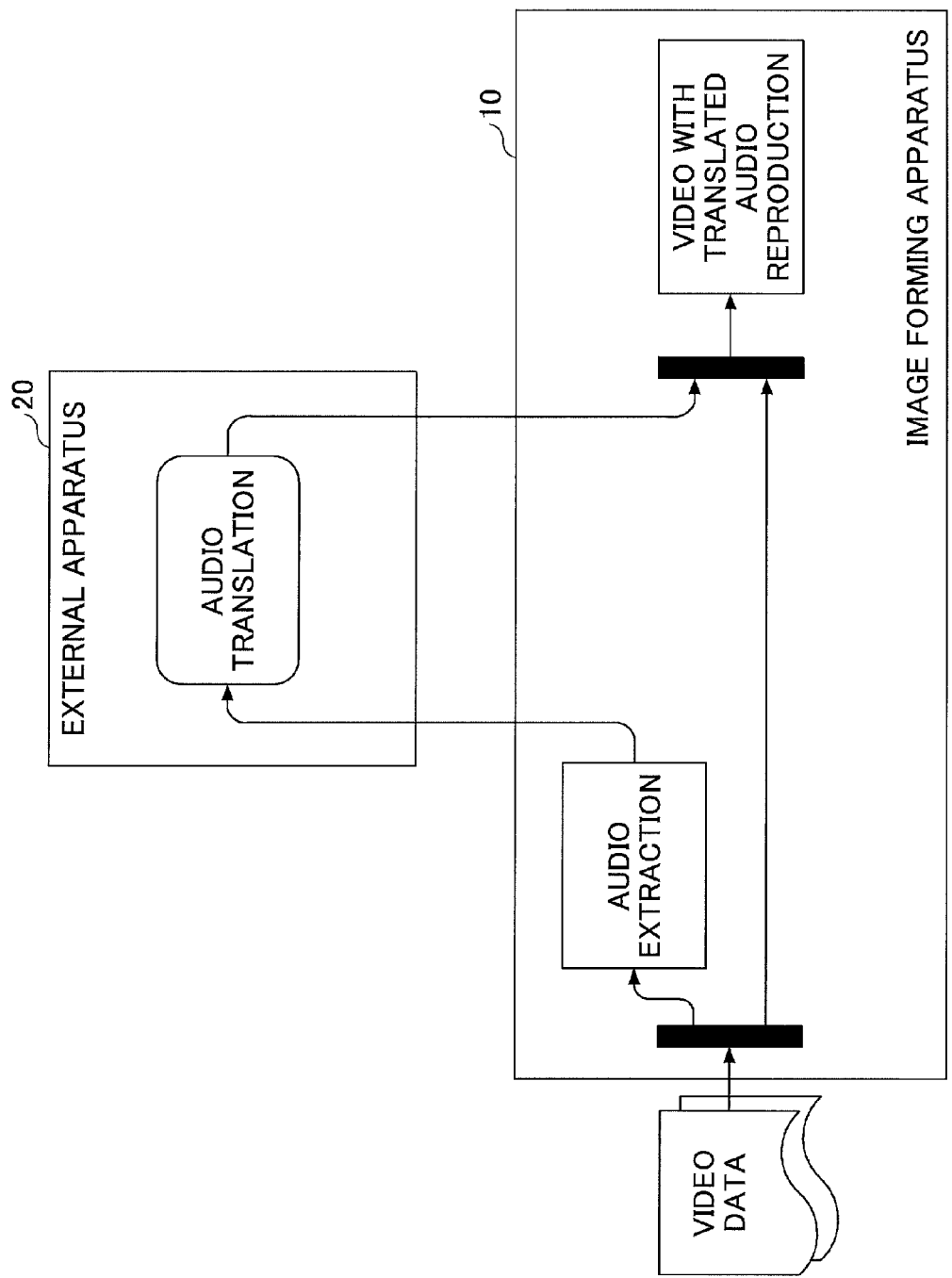
FIG. 22 is a diagram illustrating a fourth example of requesting the external apparatus to perform another image process.

FIG. 22 is a diagram illustrating a fourth example of requesting the external apparatus 20 to perform another image process. In the example of FIG. 22, the image forming apparatus 10 extracts audio data from video data and transmits the extracted audio data as reduced data to the external apparatus 20. The external apparatus 20 performs an audio translation process with respect to the reduced data and transmits translated audio data obtained by the audio translation process to the image forming apparatus 10. The image forming apparatus 10 then reproduces the translated audio data together with the video data. In this way, video data with translated audio data may be reproduced.

In the following, a third embodiment of the present invention is described. Note that the following descriptions relate to features of the third embodiment that differ from the first and/or second embodiment. Accordingly, it may be assumed that features of the third embodiment that are not specifically mentioned below may be substantially identical to the first and/or second embodiment.

The third embodiment may be implemented in a case where the paper document includes multiple pages. The third embodiment is directed to reducing a total processing time for processing all the pages of the paper document.

Figure 23:
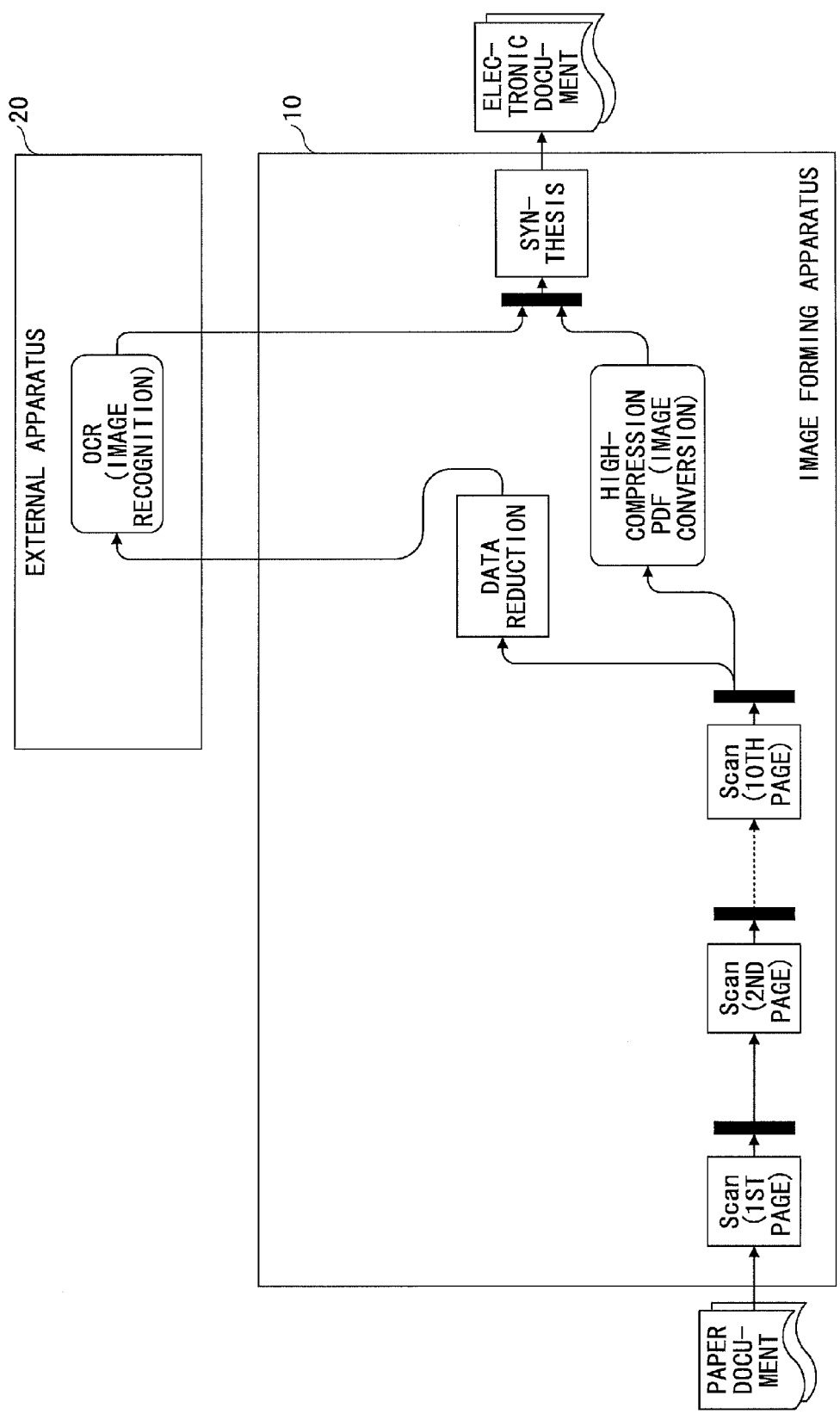
FIG. 23 is a diagram illustrating exemplary process procedures for processing a paper document including multiple pages.

For example, with respect to the image process as illustrated in FIG. 9, in a case where all the pages of a paper document are to be scanned by the scanner 12 before the various processes of FIG. 9 are performed with respect to the pages of the paper document, the process procedures may be as illustrated in FIG. 23.

FIG. 23 is a diagram illustrating exemplary process procedures for processing a paper document including multiple pages. In the example illustrated in FIG. 23, the image forming apparatus 10 scans image data from all the pages (10 pages) of a paper document, performs a data reduction process on the scanned images of the 10 pages, and transmits reduced data of the scanned images of the 10 pages to the external apparatus 20. The external apparatus 20 performs an OCR process with respect to the reduced data of the 10 pages, and returns OCR processing results (text data with coordinates) of the 10 pages to the image forming apparatus 10. While the OCR process is performed by the external apparatus 20, the image forming apparatus 10 performs a high-compression PDF conversion process on the scanned images of the 10 pages of the paper document to generate high-compression PDF data of the 10 pages. Upon receiving the text data with coordinates transmitted from the external apparatus 20, the image forming apparatus 10 generates high-compression PDF data with transparent text of the 10 pages by combining the text data with coordinates of the 10 pages and the high-compression PDF data of the 10 pages.

In the process procedures as illustrated in FIG. 23, the processing time for processing all the pages of a paper document is expected to be equal to the processing time per page multiplied by the number of pages constituting the paper document. Thus, assuming the overall processing time (from the time scanning of a page is started until high-compression PDF data with transparent text of the page is generated) per 1 page of paper document is T seconds, the total processing time t for processing N pages of the paper document may be estimated based on the following formula.

$$\text{Total Processing Time } t \text{ (sec)} = T \times N$$

That is, the total processing time t is estimated to become longer in proportion to an increase in the number of pages N of the paper document. The following formula (4) is an exemplary formula representing the total processing time t with a more detailed breakdown of the time components of the processing time T.

$$\text{Total Processing Time } t \text{ (sec)} = [\text{Scanning Time per 1 page (sec)} + \text{Data Reduction Processing Time per 1 page (sec)} + \text{OCR Processing Time per 1 page (sec)} + \text{Synthesis Processing Time per 1 page (sec)} + (\text{Data Size of Reduced Data per 1 page} + \text{Data Size of OCR Result per 1 page})/\text{Communication Speed}] \times N \quad (4)$$

Note that in the above formula (4), the processing time of the high-compression PDF conversion process is not included because the high-compression PDF conversion process may be performed in parallel with the OCR process, for example.

Based on the above formula (4), assuming the scanning time per 1 page is 2 seconds, the data reduction processing time per 1 page is 0.5 seconds, the OCR processing time per 1 page is 1 second, the synthesis processing time per 1 page is 0.5 seconds, the data size of reduced data per 1 page is 100 Kbyte, the data size of the OCR result per 1 page is 10 Kbyte, and the number of pages constituting the paper document is 10 pages, the total processing time t may be represented by the following formula (5).

$$\text{Total Processing Time } t \text{ (sec)} = [2+0.5+1+0.5+(100+10)/\text{Communication Speed}] \times 10 \quad (5)$$

FIG. 24 is a table illustrating the relationship between the communication speed and the total processing time t according to the above formula (5). FIG. 24 illustrates a first exemplary relationship between the communication speed and the total processing time t.

The third embodiment of the present invention is directed to reducing the total processing time t as described above.

According to an aspect of the third embodiment, after scanning of an n-th page of a paper document is completed, a data reduction process, an OCR process, a synthesis process, and back-and-forth data transmission processes with respect to the n-th page are performed in parallel with the scanning of an (n+1)-th page of the paper document.

Figure 25:
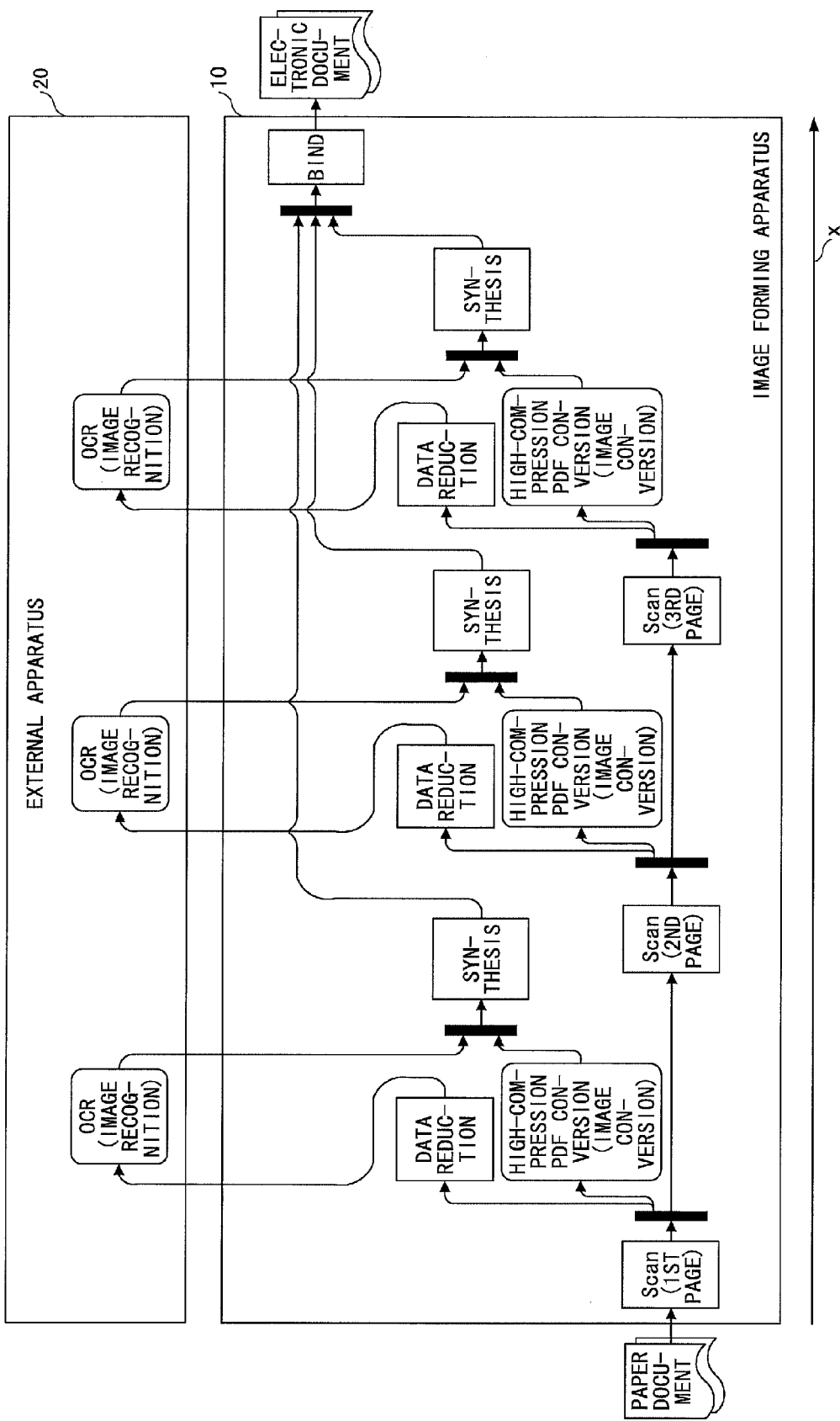
FIG. 25 is a diagram schematically illustrating process procedure according to a third embodiment of the present invention.

FIG. 25 is a diagram schematically illustrating process procedures according to the third embodiment. Note that in FIG. 25, the various processes represented by rectangles are executed in order according to their relative positioning with respect to a time axis x extending in the horizontal direction. That is, in FIG. 25, after scanning of a first page of a paper document by the image forming apparatus 10 is completed, a data reduction process on the scanned image of the first page, transmission of the reduced data to the external apparatus 20, an OCR process on the reduced data by the external apparatus 20, transmission of the OCR result (text data with coordinates) from the external apparatus 20 to the image forming apparatus 10, conversion of the scanned image of the first page into high-compression PDF data, and synthesis of the text data with coordinates and the high-compression PDF data are performed in parallel with the scanning of a second page of the paper document by the image forming apparatus 10. Thus, high-compression PDF data with transparent text is generated with respect to each individual page. After high-compression PDF data with transparent text for all the pages of the paper document have been generated, the image forming apparatus 10 performs a binding process for binding together the high-compression PDF data with transparent text generated for all of the pages in the relevant page order (hereinafter referred to as "binding process"). Note that in some embodiments, the binding process may be carried out sequentially each time high-compression PDF data with transparent text of a page is generated. For example, after a synthesis process with respect to an N-th page is completed, the binding process may be performed to bind the high-compression PDF data with transparent text of the N-th page and the binding results of pages up to the (N−1)-th page.

Note that if the "Scanning Time" (per page) is greater than "Transmission Time+Data Reduction Processing Time+OCR Processing Time+Synthesis Processing Time" (per page), the data reduction process, the back-and-forth data transmission processes, the OCR process, and the synthesis process performed with respect to the n-th page after scanning the n-th page may be completed within the scanning time of the (n+1)-th page, and in such case, the above sum of the processing times and the transmission times may be disregarded. Thus, according to an aspect of the third embodiment, the total processing time t may be represented by the following formula (6).

$$\text{Total Processing Time } t \text{ (sec)} = \text{Scanning Time of all pages} + \text{Data Reduction Processing Time of scanned image of last page} + \text{OCR Processing Time of last page} + \text{Synthesis Processing Time of last page} + \text{Binding Processing Time} + (\text{Data Size of Reduced Data of last page} + \text{Data Size of OCR Result of last page})/\text{Communication Speed} \quad (6)$$

For example, assuming the scanning time per 1 page, the data reduction processing time per 1 page, the OCR processing time per 1 page, the synthesis processing time per 1 page, the data size of reduced data per 1 page, and the data size of the OCR result per 1 page are the same as those in the example of FIG. 24, by plugging in the same values to the above formula (6) and plugging in "0 sec" as the binding processing time (for convenience), the total processing time t (sec) for processing a ten-page paper document may be represented by the following formula (7).

$$\text{Total Processing Time } t \text{ (sec)} = 20+0.5+1+0.5+0+(100+10)/\text{Communication Speed} \quad (7)$$

FIG. 26 is a table illustrating the relationship between the communication speed and the total processing time t according to formula (7).

FIG. 26 illustrates a second exemplary relationship between the communication speed and the total processing time t. By comparing FIG. 26 with FIG. 24, it can be appreciated that the total processing time t at the same communication speed may be shorter in the example of FIG. 26.

Figure 27:
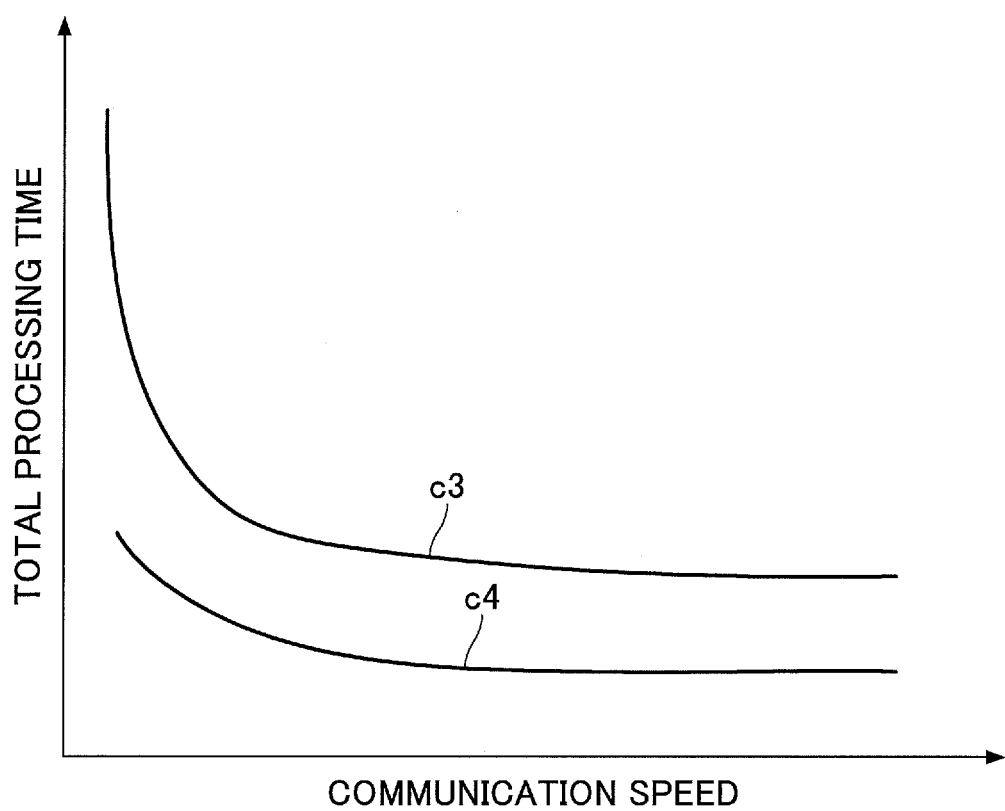
FIG. 27 is a graph illustrating a comparison between a case of scanning pages and processing the pages in series and a case of scanning pages and processing the pages in parallel.

Also, FIG. 27 is a graph comparing the exemplary relationships between the communication speed and the processing time t illustrated in FIG. 24 and FIG. 26. That is, FIG. 27 illustrates a comparison between a case where scanning of pages of a paper document and processing the pages are performed in series and a case where scanning of the pages and processing the pages are performed in parallel. Note that in the graph of FIG. 27, curve c3 corresponds to FIG. 24 (formula (5)) and curve c4 corresponds to FIG. 26 (formula (7)).

Further, by subtracting formula (6) from formula (4), the following formula (8) may be obtained.

$$\text{Formula (4)} - \text{Formula (6)} = (\text{Data Reduction Processing Time} + \text{OCR Processing Time} + \text{Synthesis Processing Time} + (\text{Data Size of Reduced Data per 1 page} + \text{Data Size of OCR Result per 1 page})/\text{Communication Speed}) \times (N-1) - \text{Binding Processing Time} \quad (8)$$

When the same values as those used in the examples of FIGS. 24 and 26 are plugged into formula (8), the following formula (9) may be obtained.

$$(0.5+1+0.5+(100+10)/\text{Communication Speed}) \times (N-1) \quad (9)$$

Note that the value of formula (9) may always be a positive value. Thus, by implementing the third embodiment, the total processing time t may be reduced in the case of processing a paper document including multiple pages. Note that in the above formula (9), the binding processing time is assumed to be 0 seconds, and as a result, the value of formula (9) may always be a positive value. However, even if the binding processing time has to be taken into account, the total processing time t may still be reduced as long as the value of formula (9) is greater than the binding processing time. For example, as the communication speed is infinitely increased, the value of formula (9) becomes substantially equal to 0.5+1+0.5=2 (seconds). The binding processing time is expected to be less than the above value (2 seconds). Thus, even if the binding processing time is taken into account, the total processing time t may most likely be reduced by implementing the third embodiment. Also, note that the above effect of the third embodiment may be enhanced as the communication speed is decreased and/or the number of pages included in the paper document is increased.

Figure 28:
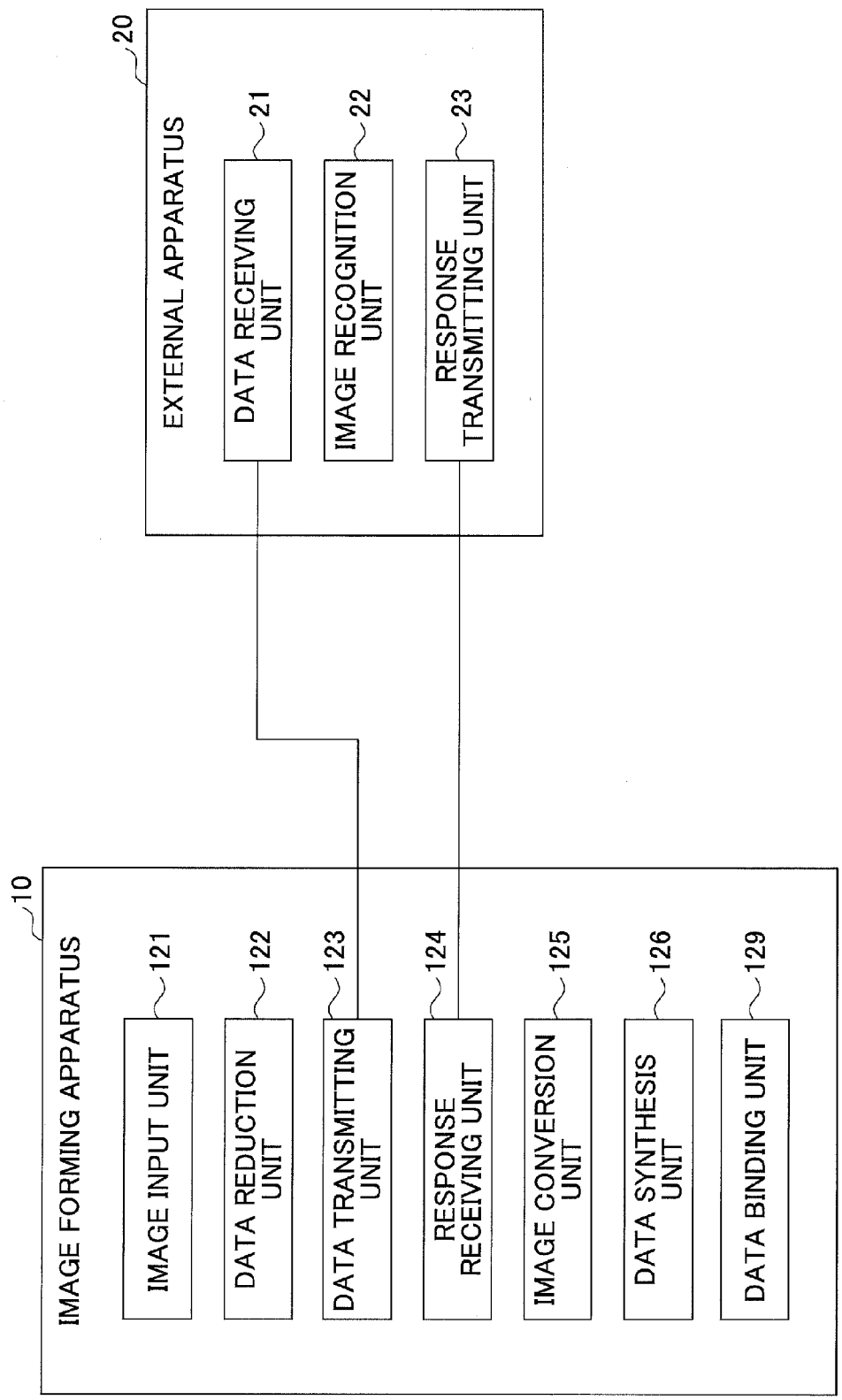
FIG. 28 is a diagram illustrating exemplary functional configurations of the image forming apparatus and the external apparatus according to the third embodiment.

FIG. 28 illustrates exemplary functional configurations of the image forming apparatus 10 and the external apparatus 20 according to the third embodiment. Note that in FIG. 28, component elements that are identical to those illustrated in FIG. 13 are given the same reference numerals and descriptions thereof are omitted.

In FIG. 28, the image forming apparatus 10 further includes a data binding unit 129. The data binding unit 129 performs a binding process with respect to the high-compression PDF data with transparent text generated for each page. The data binding unit 129 may be implemented by the CPU 111 executing a relevant program installed in the image forming apparatus 10, for example.

In the following, process procedures according to the third embodiment that are implemented by the information processing system 1 in the case of performing the specific processes as illustrated in FIG. 11 are described.

Figure 29:
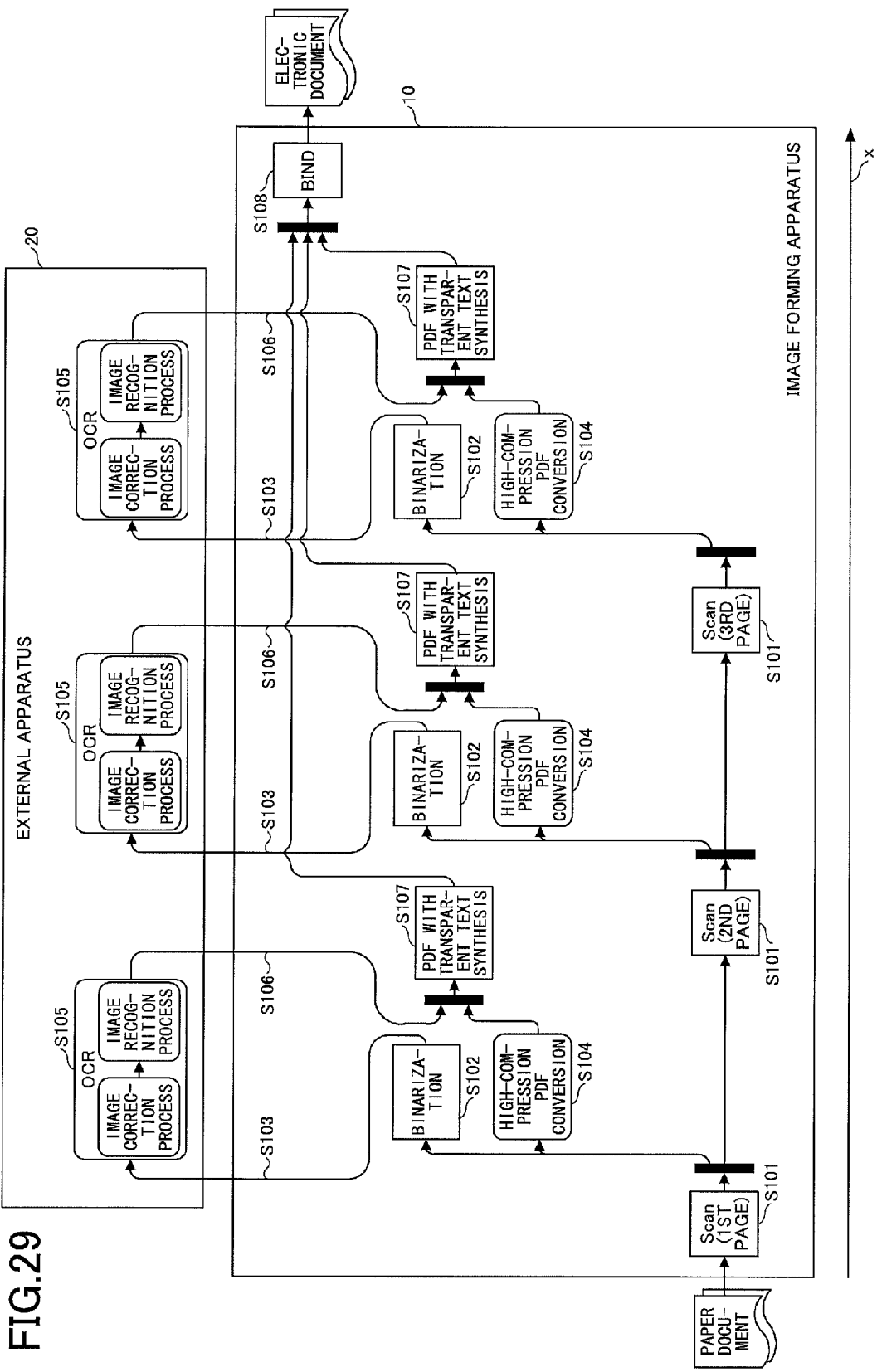
FIG. 29 is a diagram illustrating exemplary process procedures implemented by the information processing system according to the third embodiment.

FIG. 29 is a diagram illustrating exemplary process procedures implemented by the information processing system 1 according to the third embodiment. Note that processes illustrated in FIG. 29 that correspond to the process steps of FIG. 14 are given the same process step numbers and their descriptions may be omitted as appropriate. In the example illustrated in FIG. 29, it is assumed that three pages are included in the paper document.

When the image input unit 121 controls the scanner 12 to scan a first page of the paper document and generate a scanned image of the first page (step S101), the data reduction unit 122 performs a binarization process with respect to the scanned image and generates a black and white image as reduced data of the scanned image (step S102). Then, the data transmitting unit 123 transmits the reduced data to the external apparatus 20 (step S103). In response to the transmission of the reduced data, the external apparatus 20 returns identification information for identifying the text data with coordinates to be generated by the external apparatus 20 based on the reduced data (hereinafter referred to as "data ID") to the image forming apparatus 10. The data transmitting unit 123 receives the returned data ID and conveys the received data ID to the response receiving unit 124. Note that the data ID may be a URL, for example, or identification information in some other form.

Meanwhile, the image conversion unit 125 performs a high-compression PDF conversion process with respect to the scanned image of the first page, and generates high-compression PDF data of the first page (step S104). Then, the response receiving unit 124 monitors the progress of the external apparatus 20 in generating the text data with coordinates. For example, the response receiving unit 124 may perform polling with respect to the external apparatus 20 to query whether the text data with coordinates corresponding to the received data ID has been generated.

Upon receiving the reduced data of the first page, the data receiving unit 21 of the external apparatus 20 generates the data ID for the text data with coordinates to be generated based on the reduced data and returns the generated data ID to the image forming apparatus 10. Then, the image recognition unit 22 performs an OCR process with respect to the reduced data (step S105). As a result of performing the OCR process, text data with coordinates for the first page may be generated. The generated text data with coordinates may be stored in association with the data ID generated by the data receiving unit 21 in the secondary storage device 202, for example.

The response transmitting unit 23 receives a polling message from the response receiving unit 124 and determines whether text data with coordinates corresponding to the data ID included in the polling message is stored in the secondary storage device 202. If there is no corresponding text data with coordinates stored in the secondary storage device 202, the response transmitting unit 23 returns a response indicating that there is no corresponding text data with coordinates. If corresponding text data with coordinates is stored, the response transmitting unit 23 returns the corresponding text data with coordinates to the image forming apparatus (step S106).

When the response receiving unit 124 receives the text data with coordinates of the first page, the data synthesis unit 126 synthesizes the received text data with coordinates and the high-compression PDF data of the first page generated in step S104 (step S107). As a result, high-compression PDF data with transparent text for the first page may be generated.

Then, steps S101-S107 are repeated with respect to the second page and the third page of the paper document. When the processes of steps S101-S107 are completed with respect to all the pages of the paper document, the data binding unit 129 binds together the high-compression PDF data with transparent text generated for each page in the relevant page order (step S108). As a result, high-compression PDF data with transparent text of the three pages of the paper document may be assembled into a single electronic document.

Note that in the example of FIG. 29, the processes of steps S101-S107 are repeated with respect to each page. However, in other examples, the processes of steps S101-S107 may be repeated with respect to every two pages or some arbitrary number of pages. In this case, the number of pages processed in each cycle may be different or the same. Note that one cycle may correspond to the execution of one round of the processes of steps S101-S107 in the example of FIG. 29.

Also, note that in the example of FIG. 29, the response receiving unit 124 performs polling with respect to the external apparatus 20. However, the text data with coordinates may be downloaded from the external apparatus 20 to the image forming apparatus 10 using some other method. For example, upon transmitting the reduced data to the external apparatus 20, the data transmitting unit 123 may also transmit to the external apparatus 20 address information (e.g., URL) for receiving notification when the text data with coordinates corresponding to the reduced data has been generated. When the text data with coordinates corresponding to the reduced data has been generated, the response transmitting unit 23 of the external apparatus 20 may send a message to the destination indicated by the address information signaling the completion of the generation of the text data with coordinates and including the data ID of the generated text data with coordinates. The response receiving unit 124 of the image forming apparatus 10 may wait for the destination to receive the message, and once the corresponding message is received, the response receiving unit 124 may download the text data with coordinates corresponding to the data ID included in the message from the external apparatus 20.

Note that scanning of the pages of the paper document does not have to be carried out in synch with the processes of steps S102-S107. That is, in the example of FIG. 29, the scanning of the second page of the paper document is performed in parallel with the processes of steps S102-S107 that are performed with respect to the first page. However, the scanning of each page and the processes of steps S102-S107 may be performed asynchronously such that, for example, scanning of the third page or a subsequent page may be performed while the processes of steps S102-S107 with respect to the first page are performed. That is, the scanning of each page may be performed according to the performance of the scanner 12. In this case, for example, the processes of steps S102-S107 may be performed in a batch with respect to scanned images of a plurality of pages that have already been scanned.

As can be appreciated, according to an aspect of the third embodiment, the data reduction unit 122 and the image conversion unit 125 execute their corresponding processes before scanning of all the pages of a paper document is completed. That is, the data reduction unit 122 and the image conversion unit 125 execute their corresponding processes each time a part of the pages of the paper document is scanned. Also, each time the data reduction unit 122 generates reduced data of the part of the pages, the data transmitting unit 123 transmits the reduced data of the part of the pages to the external apparatus 20. Further, each time high-compression PDF data of the part of the pages and text data with coordinates of the part of the pages are generated, the data synthesis unit 126 performs a synthesis process with respect to the generated high-compression PDF data and text data with coordinates. In addition, the scanner 12 and the image input unit 121 perform scanning of the pages of the paper document asynchronously and in parallel with the processes of the data reduction unit 122, the image conversion unit 125, the data transmitting unit 123, the response receiving unit 124, and the data synthesis unit 126. In this way, the total processing time t for processing all the pages of the paper document may be reduced.

Note that the image conversion unit 125 does not necessarily have to perform the high-compression PDF conversion process with respect to each page or with respect to each part of the pages. For example, the high-compression PDF conversion process may be performed in a batch with respect to a plurality of pages, or with respect to all the pages of the paper document at once.

In the following, a fourth embodiment of the present invention is described. Note that the following descriptions relate to features of the fourth embodiment that differ from the third embodiment. Accordingly, it may be assumed that features of the fourth embodiment that are not specifically mentioned below may be substantially identical to the third embodiment.

Figure 30:
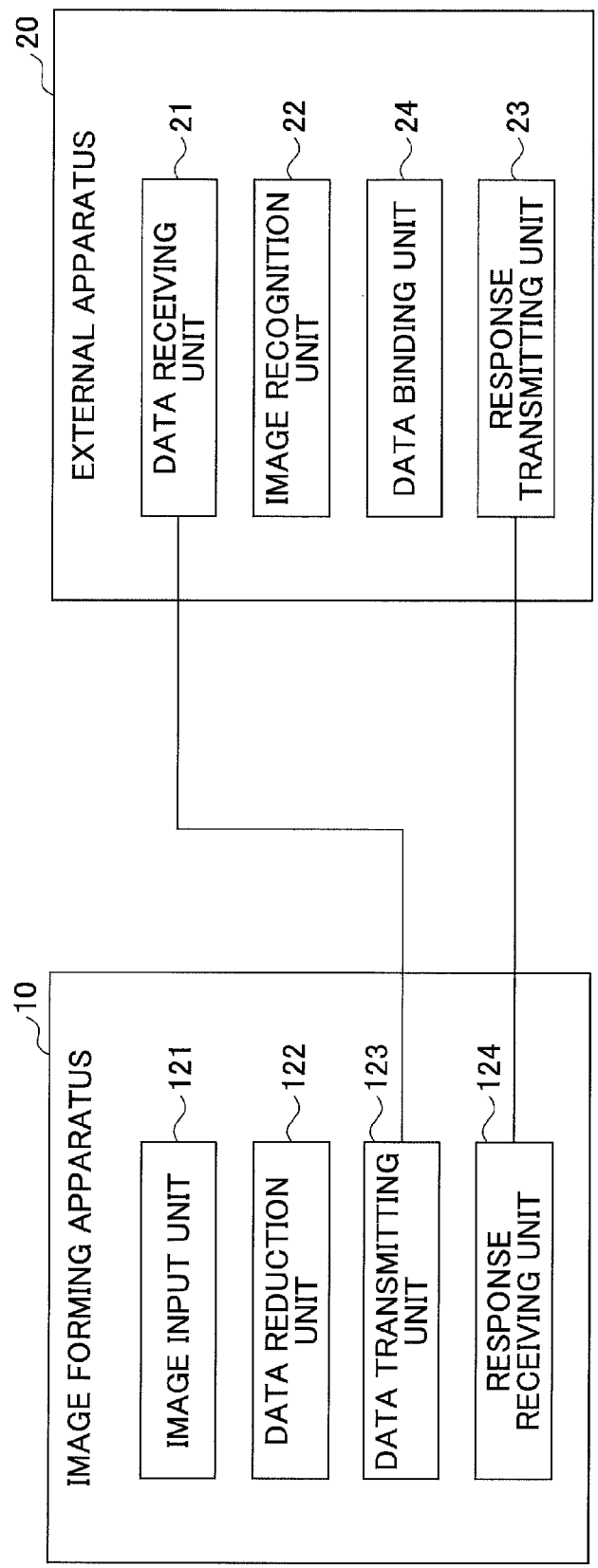
FIG. 30 is a diagram illustrating exemplary functional configurations of the image forming apparatus and the external apparatus according to a fourth embodiment of the present invention.

FIG. 30 illustrates exemplary functional configurations of the image forming apparatus 10 and the external apparatus 20 according to the fourth embodiment. In FIG. 30, component elements that are identical to those illustrated in FIG. 28 are given the same reference numerals and descriptions thereof are omitted.

As illustrated in FIG. 30, according to the fourth embodiment, the image forming apparatus 10 does not include the image conversion unit 125, the data synthesis unit 126, and the data binding unit 129. On the other hand, the external apparatus 20 further includes a data binding unit 24. The data binding unit 24 performs a binding process for binding together text data with coordinates generated with respect to each page in the relevant page order.

Figure 31:
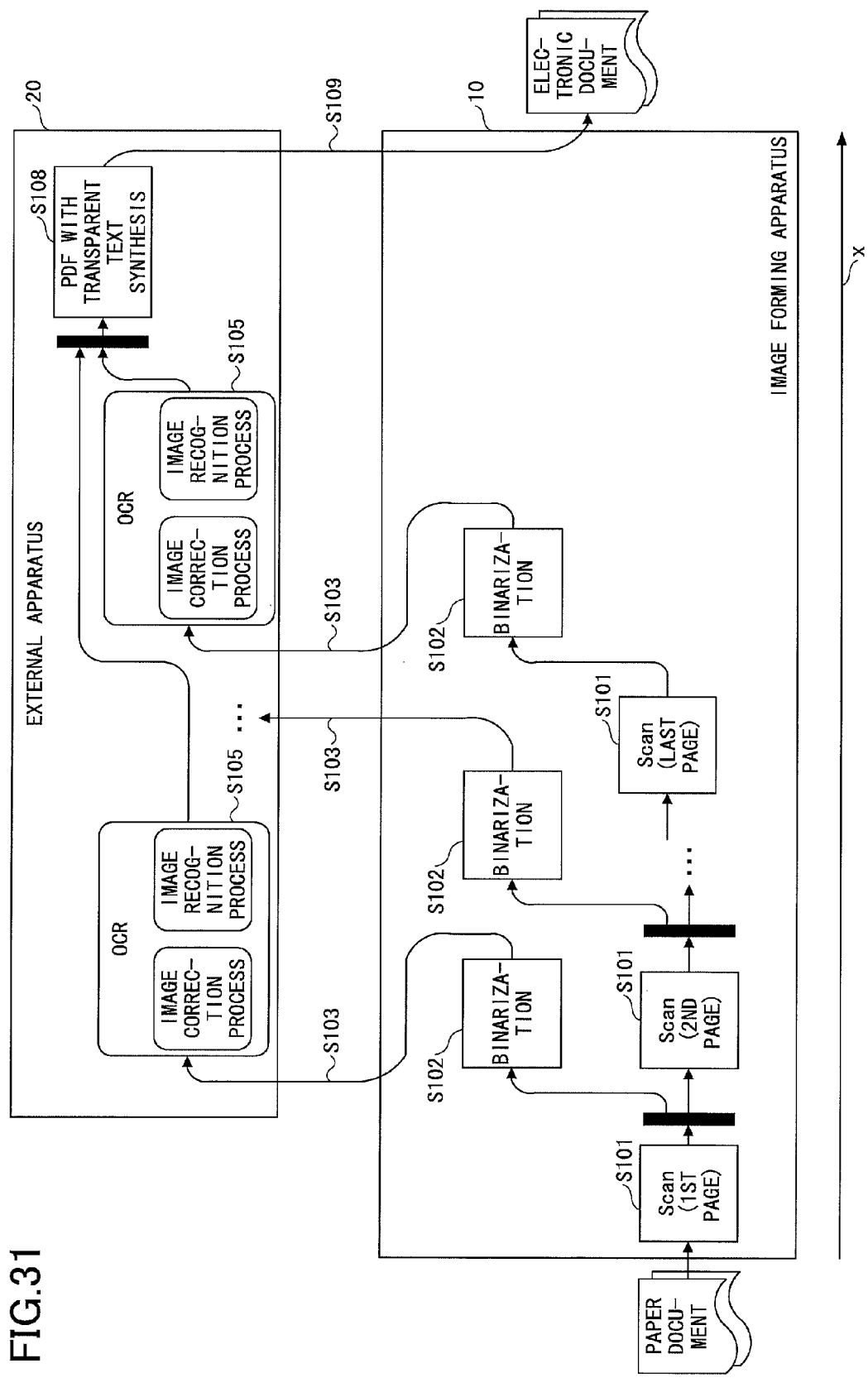
FIG. 31 is a diagram illustrating exemplary process procedures implemented by the information processing system according to the fourth embodiment.

FIG. 31 illustrates exemplary process procedures implemented by the information processing system 1 according to the fourth embodiment. Note that processes illustrated in FIG. 31 that correspond to the process steps of FIG. 29 are given the same step numbers and descriptions thereof may be omitted.

According to the fourth embodiment, the text data with coordinates of all the pages of the paper document corresponds to the final product of the process implemented by the information processing system 1. Thus, according to the fourth embodiment, the processes of steps S101-S103 and step S105 are repeated with respect to each page (or each part of the pages of the paper document).

In FIG. 31, when the data transmitting unit 123 of the image forming apparatus 10 transmits reduced data of the last page of the paper document, the data transmitting unit 123 also transmits to the external apparatus 20, the data ID of each previous page of the paper document coming before the last page that have been returned from the external apparatus 20 (step S103). Note that the data ID of each previous page transmitted along with the reduced data of the last page corresponds to the data ID returned by the external apparatus 20 each time the transmission process of step S103 is performed with respect to a page.

Upon receiving the reduced data of the last page and the data ID of each previous page from the image forming apparatus 10, the data receiving unit 21 of the external apparatus 20 generates data ID corresponding to the reduced data. Then, the image recognition unit 22 performs an OCR process with respect to the reduced data to generate text data with coordinates of the last page (step S105). The generated text data with coordinates may be stored in association with the data ID generated by the data receiving unit 21 in the secondary storage device 202, for example.

Then, the data binding unit 24 binds together the text data with coordinates corresponding to the received data ID of each previous page and the text data with coordinates corresponding to the data ID generated for the last page that are stored in the secondary storage unit 202 in the relevant page order (step S108). In this way, one single set of text data with coordinates may be generated. The response transmitting unit 23 then transmits the generated text data with coordinates to the image forming apparatus 10 (step S109). The response receiving unit 124 receives the text data with the coordinates.

As described above, according to the fourth embodiment of the present invention, data generated by the external apparatus 20 (e.g. text data with coordinates) may be the final product of the process implemented by the information processing system 1.

In the following, a fifth embodiment of the present invention is described. Note that the following descriptions relate to features of the fifth embodiment that differ from the third embodiment. Accordingly, it may be assumed that features of the fifth embodiment that are not specifically mentioned below may be substantially identical to the third embodiment.

Figure 32:
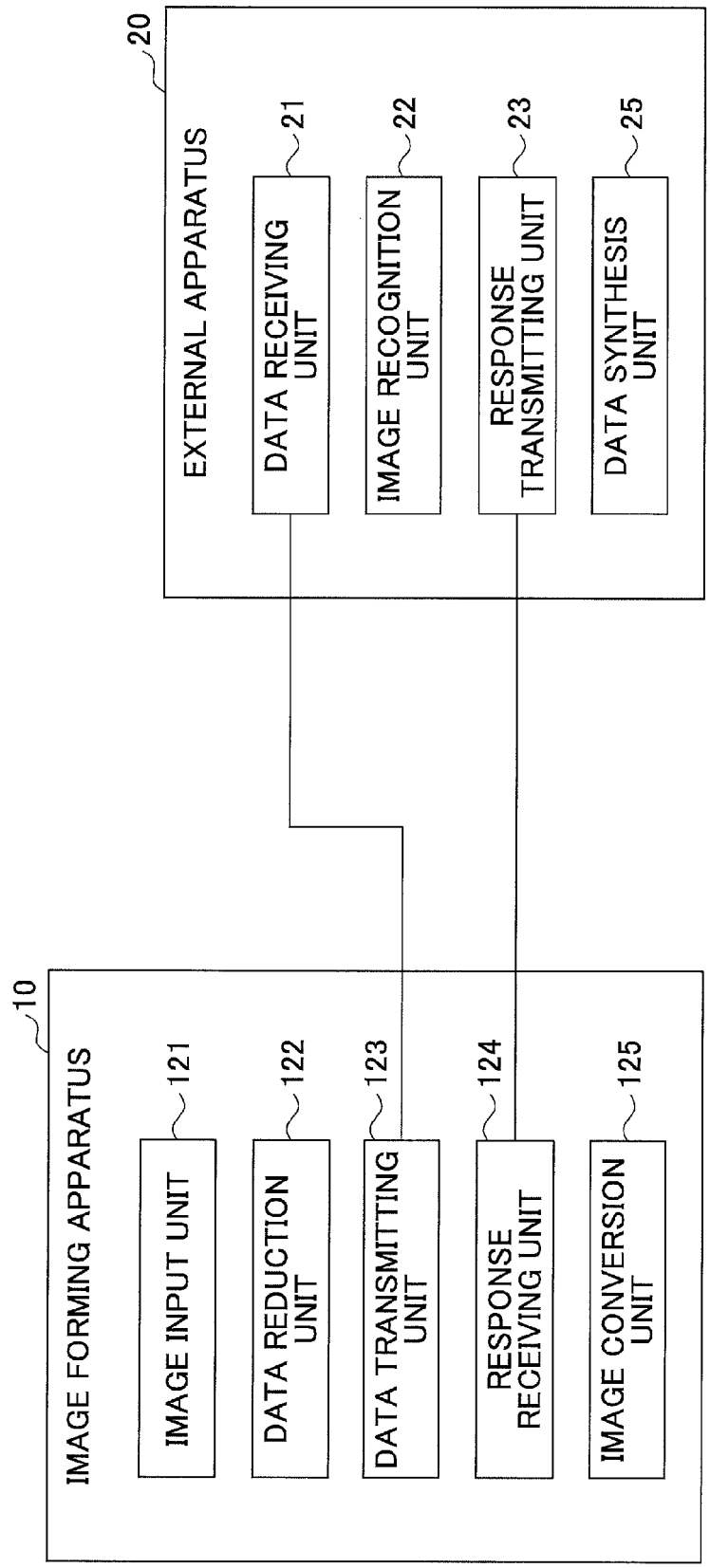
FIG. 32 is a diagram illustrating exemplary functional configurations of the image forming apparatus and the external apparatus according to a fifth embodiment of the present invention.

FIG. 32 illustrates exemplary functional configurations of the image forming apparatus 10 and the external apparatus 20 according to the fifth embodiment. Note that in FIG. 32, component elements that are identical to those illustrated in FIG. 28 are given the same reference numerals and descriptions thereof are omitted.

As illustrated in FIG. 32, according to an aspect of the fifth embodiment, the image forming apparatus 10 does not have to include the data synthesis unit 126 and the data binding unit 129. On the other hand, the external apparatus 20 further includes a data synthesis unit 25. The data synthesis unit 25 synthesizes text data with coordinates and high-compression PDF data to generate high-compression PDF data with transparent text.

Figure 33:
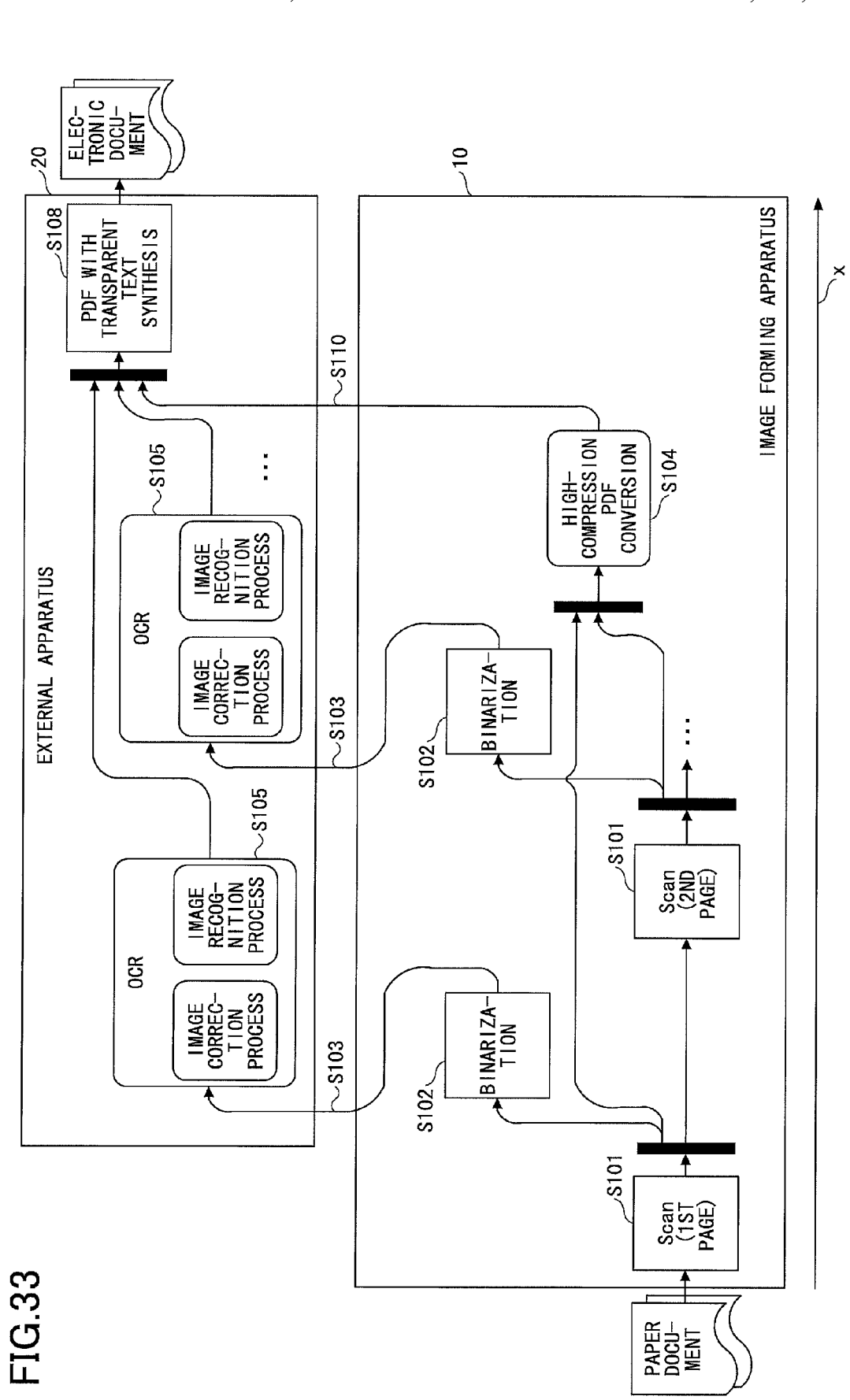
FIG. 33 is a diagram illustrating exemplary process procedures implemented by the information processing system according to the fifth embodiment.

FIG. 33 illustrates exemplary process procedures implemented by the information processing system 1 according to the fifth embodiment. Note that processes illustrated in FIG. 33 that correspond to the process steps of FIG. 29 are given the same process step numbers and descriptions thereof may be omitted as appropriate.

According to the fifth embodiment, the processes of steps S101-S103 and step S105 are repeated with respect to each page (or each part of the pages of the paper document).

In FIG. 33, when a scanned image of the last page of the paper document is generated, the image conversion unit 125 of the image forming apparatus 10 generates high-compression PDF data of all the pages of the paper document based on the scanned images of all the pages of the document (step S104). Then, the data transmitting unit 123 transmits the generated high-compression PDF data and the data ID of each page to the external apparatus 20 (step S110).

When the data receiving unit 21 of the external apparatus 20 receives the high-compression PDF data and the data ID of each page from the image forming apparatus 10, the data synthesis unit 25 synthesizes the received high-compression PDF data and the corresponding text data with coordinates associated with the received data ID of each page that is stored in the secondary storage unit 202 to generate high-compression PDF data with transparent text (step S108).

As can be appreciated, the data synthesis process for synthesizing text data with coordinates and high-compression PDF data may be performed at the external apparatus 20. The fifth embodiment may be suitably implemented in an application where the external apparatus 20 is configured to deliver the synthesized high-compression PDF data with transparent text to a given destination, for example.

In the following, a sixth embodiment of the present invention is described. Note that the following descriptions relate to features of the sixth embodiment that differ from the third embodiment. Accordingly, it may be assumed that features of the sixth embodiment that are not specifically mentioned below may be substantially identical to the third embodiment.

Figure 34:
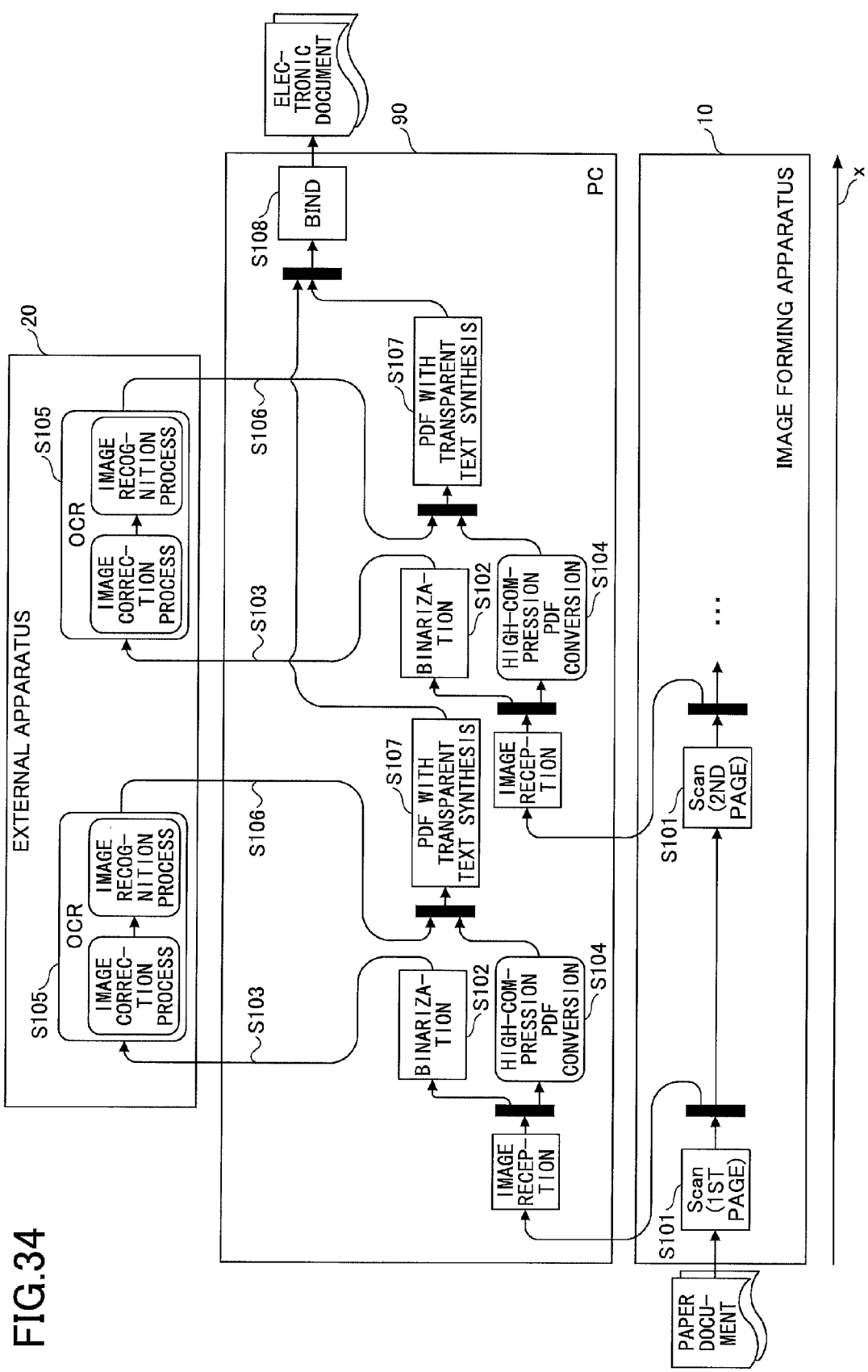
FIG. 34 is a diagram illustrating exemplary process procedures implemented by the information processing system according to a sixth embodiment of the present invention.

FIG. 34 illustrates exemplary process procedures implemented by the information processing system 1 according to the sixth embodiment. Note that processes illustrated in FIG. 34 that correspond to the process steps of FIG. 29 are given the same process step numbers and descriptions thereof may be omitted as appropriate.

According to the sixth embodiment, the binarization process on a scanned image, the generation of high-compression PDF data, and the generation of high-compression PDF data with transparent text are performed by a PC 90 that is connected to the image forming apparatus 10 via a network. In other words, the image forming apparatus 10 is dedicated to scanning the paper document. Thus, according to the sixth embodiment, the PC 90 includes the functional elements of the image forming apparatus 10 illustrated in FIG. 28 except for the image input unit 121, and the image forming apparatus 10 only needs the image input unit 121.

In FIG. 34, each time a page is scanned, the image forming apparatus 10 transmits the scanned image of the page to the PC 90. In turn, the PC 90 and the external apparatus 20 perform the processes of steps S102-S107 with respect to the scanned image.

Note that the PC 90 is preferably connected to the image forming apparatus 10 via a network that has a lower communication load as compared with that of the network N1 to which the external apparatus 20 is connected. For example, the PC 90 may be connected to the image forming apparatus 10 via a USB (Universal Serial Bus) cable or a LAN (Local Area Network). Also, a device other than a PC (personal computer) may be used instead of the PC 90.

As can be appreciated, the binarization process on a scanned image, the generation of high-compression PDF data, and the generation of high-compression PDF data with transparent text may be performed by a device other than the image forming apparatus 10.

Note that the image forming apparatus 10 used in the above-described embodiments is an example of a device. The external apparatus 20 is an example of an information processing apparatus. The scanner 12 and the image input unit 121 are examples of a scanning unit. The data reduction unit 122 is an example of a reduction unit. The data transmitting unit 123 is an example of a first transmitting unit. The response receiving unit 124 is an example of a first receiving unit. The image conversion unit 125 is an example of a second data generating unit. The data synthesis unit 126 is an example of a synthesis unit. The data receiving unit 21 is an example of a second receiving unit. The image recognition unit 22 is an example of a first data generating unit. The response transmitting unit 23 is an example of a second transmitting unit. The high-compression PDF data with transparent text is an example of PDF data with transparent text. The high-compression PDF data is an example of second data. The image conversion process such as the high-compression PDF conversion process is an example of a second process. The image recognition process such as the OCR process is an example of a first process. The text data with coordinates is an example of first data.

According to one aspect of the present invention, an information processing system is provided that includes a device and an information processing apparatus that is connected to the device via a network. The device includes a scanning unit configured to scan image data from a paper document; a reduction unit configured to generate reduced data from image data of a part of pages of the paper document each time the image data of the part of the pages of the paper document is scanned by the scanning unit, the reduced data being generated by reducing a data size of the image data of the part of the pages of the paper document; a first transmitting unit configured to transmit the reduced data to the information processing apparatus each time the reduced data is generated by the reduction unit; a second data generating unit configured to perform a second process with respect to the image data scanned from the paper document by the scanning unit and generate second data, the second process being different from a first process that is performed by the information processing apparatus; a first receiving unit configured to receive via the network, first data generated by the first process that is performed by the information processing apparatus with respect to the reduced data; and a synthesis unit configured to synthesize the first data and the second data. The scanning unit scans the image data from the paper document in parallel with the generation of the reduced data by the reduction unit, the transmission of the reduced data by the first transmitting unit, the reception of the first data by the first receiving unit, and the synthesis by the synthesis unit. The information processing apparatus includes a second receiving unit configured to receive the reduced data transmitted by the first transmitting unit, a first data generating unit configured to perform the first process with respect to the reduced data received by the second receiving unit and generate the first data, and a second transmitting unit configured to transmit the first data generated by the first data generating unit to the device.

According to another aspect of the present invention, an information processing system is provided that includes a device and an information processing apparatus that is connected to the device via a network. The device includes a scanning unit configured to scan image data from a paper document; a reduction unit configured to generate reduced data from image data of a part of pages of the paper document each time the image data of the part of the pages of the paper document is scanned by the scanning unit, the reduced data being generated by reducing a data size of the image data of the part of the pages of the paper document; a first transmitting unit configured to transmit the reduced data to the information processing apparatus each time the reduced data is generated by the reduction unit; and a first receiving unit configured to receive via the network, first data generated by a first process performed by the information processing apparatus with respect to the reduced data. The scanning unit scans the image data from the paper document in parallel with the processes of the reduction unit, the first transmitting unit, and the first receiving unit. The information processing apparatus includes a second receiving unit configured to receive the reduced data that is transmitted by the first transmitting unit, a first data generating unit configured to perform the first process with respect to the reduced data received by the second receiving unit and generate the first data, and a second transmitting unit configured to transmit the first data generated by the first data generating unit to the device.

Although the present invention has been described above with reference to certain illustrative embodiments, the present invention is not limited to these embodiments, and numerous variations and modifications may be made without departing from the scope of the present invention.

The present application is based on and claims the benefit of priority of Japanese Patent Application No. 2014-213843 filed on Oct. 20, 2014 and Japanese Patent Application No. 2015-205216 filed on Oct. 19, 2015, the entire contents of which are hereby incorporated by reference.

What is claimed is:

1. An information processing system comprising:
a device; and
an information processing apparatus connected to the device via a network;
wherein the device includes
a scanner configured to scan image data from a paper document and generate scanned image data;
a first hardware processor configured to implement processes of:
generating reduced image data of a part of pages of the paper document each time the scanned image data of the part of the pages of the paper document is scanned by the scanner, the reduced data being generated by reducing a data size of the scanned image data of the part of the pages of the paper document;
transmitting the reduced data to the information processing apparatus each time the reduced data is generated by the hardware processor;
performing a second process with respect to the scanned image data to generate second data, the second process being different from an optical character recognition process that is performed by the information processing apparatus;
receiving, via the network, optical character recognition data generated by the optical character recognition process performed by the information processing apparatus with respect to the reduced data; and
synthesizing the optical character recognition data and the second data to generate a synthesized document based on the optical character recognition data and the second data;
wherein the scanner scans the image data from the paper document in parallel with the generation of the reduced data, the transmission of the reduced data, the reception of the first data, and the synthesis of the optical character recognition data and the second data by the-hardware processor; and
wherein the information processing apparatus includes
a second hardware processor configured to implement processes of:
receiving the reduced data transmitted by the first hardware processor;
performing the optical character recognition process with respect to the reduced data received by the second hardware processor to generate the optical character recognition data; and
transmitting the generated optical character recognition data to the device.

2. The information processing system as claimed in claim 1, wherein the first hardware processor generates the reduced data by performing a binarization process with respect to the scanned image data, the binarization process being included in the optical character recognition process.

3. The information processing system as claimed in claim 2, wherein the optical character recognition process is a process for extracting text data from the scanned image data.

4. The information processing system as claimed in claim 3, wherein the first hardware processor synthesizes the generated text data and the second data.

5. The information processing system as claimed in claim 3, wherein
the first hardware processor generates PDF data based on the scanned image data, and synthesizes the text data and the PDF data to generate PDF data with transparent text.

6. An information processing method implemented by a device and an information processing apparatus connected to the device via a network, the processes of information processing method being implemented by each of the device and the information processing apparatus, wherein
processes implemented by the device comprise:

scanning image data from a paper document to generate scanned image data;

generating reduced data from the scanned image data of a part of pages of the paper document each time the part of the pages of the paper document is scanned, the reduced data being generated by reducing a data size of the scanned image data of the part of the pages of the paper document;

transmitting the reduced data to the information processing apparatus each time the reduced data is generated;

performing a second process with respect to the scanned image data from the paper document and generating second data, the second process being different from an optical character recognition process that is performed by the information processing apparatus;

receiving via the network, optical character recognition data generated by the optical character recognition process performed by the information processing apparatus with respect to the reduced data;

synthesizing the optical character recognition data and the second data to generate a synthesized document based on the optical character recognition data and the second data;

wherein the image data from the paper document is scanned in parallel with the generation of the reduced data, the transmission of the reduced data, the reception of the first data, and the synthesis of the optical character recognition data and the second data; and processes implemented by the information processing apparatus comprise:

receiving the reduced data transmitted by the device;

performing the optical character recognition process with respect to the reduced data received from the device and generating the optical character recognition data; and transmitting the generated optical character recognition data to the device.

7. A non-transitory computer-readable medium storing a program configured to be executed by at least one processing unit of a device that is connected to an information processing apparatus via a network, the program when executed causing the device to perform processes of:

scanning image data from a paper document;

generating reduced data from image data of a part of pages of the paper document each time the image data of the part of the pages of the paper document is scanned, the reduced data being generated by reducing a data size of the image data of the part of the pages of the paper document;

a first transmitting of the reduced data to the information processing apparatus each time the reduced data is generated by the reduction step;

performing a second data generating process with respect to the image data scanned from the paper document by the scanning step to generate second data, the second process being different from an optical character recognition process performed by the information processing apparatus;

a first receiving, via the network, of optical character recognition data that is generated by the optical character recognition process performed by the information processing apparatus with respect to the reduced data; and synthesizing the optical character recognition data and the second data;

wherein the image data from the paper document is scanned in parallel with the reduction process, the first transmitting process, the first receiving process, and the synthesis process.

* * * * *